US008931035B2

(12) United States Patent
Golan et al.

(10) Patent No.: US 8,931,035 B2
(45) Date of Patent: Jan. 6, 2015

(54) ACCESS AUTHORIZATION HAVING EMBEDDED POLICIES

(75) Inventors: Gilad Golan, Redmond, WA (US); Mark Vayman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/944,667

(22) Filed: Nov. 11, 2010

(65) Prior Publication Data
US 2011/0126260 A1   May 26, 2011

Related U.S. Application Data

(63) Continuation of application No. 10/956,667, filed on Oct. 1, 2004, now Pat. No. 8,181,219.

(51) Int. Cl.
G06F 21/30 (2013.01)
G06F 21/54 (2013.01)
G06F 21/55 (2013.01)
G06F 21/62 (2013.01)

(52) U.S. Cl.
CPC ............... *G06F 21/30* (2013.01); *G06F 21/54* (2013.01); *G06F 21/554* (2013.01); *G06F 21/62* (2013.01)
USPC ........................................................ 726/1

(58) Field of Classification Search
CPC ............................... H04L 63/101; G06F 21/30
USPC ............................................................ 726/1
See application file for complete search history.

(56) References Cited

U.S. PATENT DOCUMENTS

| 4,584,639 | A  | 4/1986  | Hardy            |
| 5,187,790 | A  | 2/1993  | East et al.      |
| 5,974,549 | A  | 10/1999 | Golan            |
| 6,317,742 | B1 | 11/2001 | Nagaratnam et al.|
| 6,353,886 | B1 | 3/2002  | Howard et al.    |
| 6,412,070 | B1 | 6/2002  | Van Dyke et al.  |
| 6,480,962 | B1 | 11/2002 | Touboul          |
| 6,529,938 | B1 | 3/2003  | Cochran et al.   |

(Continued)

FOREIGN PATENT DOCUMENTS

| EP | 1071017     | 1/2001 |
| EP | 1 320 010 A3| 6/2003 |

(Continued)

OTHER PUBLICATIONS

Ryutov, Tatyana, et al., "Integrated Access Control and Instrusion Detection for Web Servers," IEEE Transactions on Parallel and Distributed Systems, vol. 14, No. 9, Sep. 2003 (pp. 841-850).

(Continued)

*Primary Examiner* — Jacob Lipman
(74) *Attorney, Agent, or Firm* — Timothy Churna; Kate Drakos; Micky Minhas

(57) ABSTRACT

A facility for receiving an embedded policy is provided. The facility checks an application program image for the presence of an embedded policy. If an embedded policy is detected, the facility extracts the policy from within the application program image. The facility may then apply the extracted policy to the application program image before the application program image is loaded and/or executed. Moreover, the facility may check the application program image's integrity prior to extracting the embedded policy.

30 Claims, 16 Drawing Sheets

(56) References Cited

U.S. PATENT DOCUMENTS

| | | | |
|---|---|---|---|
| 6,625,603 | B1 | 9/2003 | Garg et al. |
| 6,647,388 | B2 | 11/2003 | Numao et al. |
| 6,658,002 | B1* | 12/2003 | Ross et al. .................. 370/392 |
| 6,681,331 | B1 | 1/2004 | Munson et al. |
| 6,691,232 | B1 | 2/2004 | Wood et al. |
| 6,762,764 | B2 | 7/2004 | Hiwada et al. |
| 6,957,261 | B2 | 10/2005 | Lortz |
| 7,013,332 | B2 | 3/2006 | Friedel et al. |
| 7,020,645 | B2 | 3/2006 | Bisbee et al. |
| 7,080,077 | B2 | 7/2006 | Ramamurthy et al. |
| 7,103,914 | B2 | 9/2006 | Focke et al. |
| 7,185,192 | B1 | 2/2007 | Kahn |
| 7,231,661 | B1 | 6/2007 | Villavicencio et al. |
| 7,251,831 | B2 | 7/2007 | Gilbert et al. |
| 7,506,364 | B2 | 3/2009 | Vayman |
| 7,685,632 | B2 | 3/2010 | Vayman |
| 7,818,781 | B2 | 10/2010 | Golan et al. |
| 7,853,993 | B2 | 12/2010 | Vayman |
| 7,904,956 | B2 | 3/2011 | Golan et al. |
| 2002/0091798 | A1 | 7/2002 | Joshi et al. |
| 2002/0099952 | A1 | 7/2002 | Lambert et al. |
| 2002/0157015 | A1 | 10/2002 | Gilbert et al. |
| 2002/0188568 | A1 | 12/2002 | Nickolaisen et al. |
| 2002/0199109 | A1 | 12/2002 | Boom |
| 2003/0009675 | A1 | 1/2003 | Rygaard |
| 2003/0018786 | A1 | 1/2003 | Lortz |
| 2003/0023873 | A1 | 1/2003 | Ben-Itzhak |
| 2003/0097594 | A1* | 5/2003 | Penders .................. 713/201 |
| 2003/0115179 | A1 | 6/2003 | Prabakaran et al. |
| 2003/0115246 | A1 | 6/2003 | Mahon et al. |
| 2003/0159070 | A1 | 8/2003 | Mayer et al. |
| 2004/0010519 | A1 | 1/2004 | Sinn et al. |
| 2004/0034794 | A1 | 2/2004 | Mayer et al. |
| 2004/0128537 | A1 | 7/2004 | Zurko et al. |
| 2004/0139202 | A1 | 7/2004 | Talwar et al. |
| 2004/0181788 | A1 | 9/2004 | Kester et al. |
| 2004/0193606 | A1 | 9/2004 | Arai et al. |
| 2004/0268148 | A1 | 12/2004 | Karjala et al. |
| 2005/0097353 | A1 | 5/2005 | Patrick et al. |
| 2005/0177724 | A1 | 8/2005 | Ali et al. |
| 2005/0256664 | A1 | 11/2005 | Blumfield et al. |
| 2005/0257207 | A1 | 11/2005 | Blumfield et al. |
| 2005/0257208 | A1 | 11/2005 | Blumfield et al. |
| 2006/0005227 | A1 | 1/2006 | Samuelsson et al. |
| 2006/0075461 | A1 | 4/2006 | Vayman |
| 2006/0075462 | A1 | 4/2006 | Golan et al. |
| 2006/0075464 | A1 | 4/2006 | Golan et al. |
| 2006/0075469 | A1 | 4/2006 | Vayman |
| 2006/0075492 | A1 | 4/2006 | Golan et al. |
| 2007/0143851 | A1 | 6/2007 | Nicodemus et al. |
| 2009/0150990 | A1 | 6/2009 | Vayman |
| 2012/0036554 | A1 | 2/2012 | Golan et al. |
| 2013/0254835 | A1 | 9/2013 | Golan et al. |

FOREIGN PATENT DOCUMENTS

| | | |
|---|---|---|
| JP | 2003-233521 | 8/2003 |
| JP | 2004-192601 | 8/2004 |
| JP | 2004-220120 | 8/2004 |
| JP | 2005-209070 | 8/2005 |
| KR | 1998-070410 | 10/1998 |
| KR | 10-2003-0096277 | 12/2003 |
| KR | 10-2004-0019033 | 3/2004 |
| RU | 2207619 | 6/2003 |
| WO | WO00/56027 A1 | 9/2000 |

OTHER PUBLICATIONS

Godik S., et al., OASIS, Extensible Access Control Markup Language (XACML), Version 1.0, OASIS Standard, Feb. 18, 2003.
European Search Report, European Patent Application No. 05 10 8704, Microsoft Corporation, Sep. 15, 2006.
Ashley, P. et al., "Applying Authorization to Intranets: Architechtures, Issues and APIs," Computer Communications, Elsevier Science Publishers BV, Amsterdam, NL, vol. 23, No. 17, Nov. 1, 2000, pp. 1613-1620.
International Telecommunication Union, ITU-T, Data Networks and Open System Communications Security, Information Technology—Open Systems Interconnection—Security Frameworks for Open Systems: Access Control Framework, Nov. 1995.
European Search Report for EP Patent Application No. 05108704.7, Microsoft Corporation, Mar. 3, 2006.
The Authoritative Dictionary of IEEE Standards and Terms (7th ed., 2000), pp. 101-102.
Microsoft Press Computer Dictionary: The Comprehensive Standard for Business, School, Library, and Home (2d ed., 1994), pp. 43-44.
China Patent Office of the People's Republic of China Notice on First Office Action mailed Apr. 10, 2009, in China Application No. 200510108862.7, 8 pgs.
European Communication mailed May 22, 2007, in Application No. 05108704.7, 1 page.
Response to European Communication mailed May 22, 2007, in Application No. 05108704.7, dated Oct. 8, 2007, 18 pgs.
European Communication mailed Mar. 10, 2010, in Application No. 05108704.7, 6 pgs.
Sandhu, Ravi S., and Samarati, Pierangela, "Access Control: Principles and Practice," IEEE Communications Magazine 32, Sep. 1994, No. 9, pp. 40-48.
"Audit-Failed Logon Attempts by Undefined User Accounts," IBM Technical Disclosure Bulletin, IBM Corporation, vol. 37, No. 6A, Jun. 1, 1994.
Australian Communication dated May 18, 2010, in AU Application No. 2005209678, 3 pgs.
Australian Notice of Acceptance dated May 23, 2011, in AU Application No. 2005209678, 3 pgs.
Chinese Notice on First Office Action dated Dec. 12, 2008, in Chinese Application No. 200510108867.X, 22 pgs.
Chinese Notice on Grant of Patent Right for Invention dated Jan. 15, 2010, in Chinese Application No. 200510108867.X, 4 pgs.
Chinese Second Office Action dated Jun. 26, 2009, in Chinese Application No. 200510108867.X, 8 pgs.
European Communication from the Examination Division dated Aug. 6, 2008, in EP Application No. 05108532.2, 7 pgs.
European Communication from the Examination Division dated Nov. 19, 2009, in EP Application No. 05108532.2, 4 pgs.
European Communication from the Examination Division dated Sep. 10, 2007, in EP Application No. 05108532.2, 1 pg.
European Partial Search Report for EP Application No. 05108532.2, dated Aug. 25, 2006, 4 pgs.
Japanese Final Rejection mailed on Oct. 21, 2011, in Japanese Patent Application No. 2005-290091, 5 pages.
Japanese Notice of Rejection mailed on Jul. 5, 2011, in Japanese Patent Application No. 2005-290091, 4 pages.
Japanese Notice of Rejection in Application 2011-220994, mailed Jan. 13, 2012, 6 pgs.
Japanese Notice of Rejection in Application 2011-220995, mailed Dec. 22, 2011, 9 pgs.
Russian Decision on Grant of A Patent for Invention for Russian Application No. 2005130458, dated Sep. 30, 2005. [English Translation].
U.S. Appl. No. 10/956,667, Advisory Action mailed Mar. 6, 2009, 3 pgs.
U.S. Appl. No. 10/956,667, Amendment and Response filed Jan. 27, 2010, 12 pgs.
U.S. Appl. No. 10/956,667, Amendment and Response filed Feb. 24, 2009, 8 pgs.
U.S. Appl. No. 10/956,667, Amendment and Response filed Apr. 8, 2009, 9 pgs.
U.S. Appl. No. 10/956,667, Amendment and Response filed May 17, 2010, 14 pgs.
U.S. Appl. No. 10/956,667, Amendment and Response filed Jun. 1, 2010, 11 pgs.
U.S. Appl. No. 10/956,667, Amendment and Response filed Jul. 28, 2010, 17 pgs.
U.S. Appl. No. 10/956,667, Amendment and Response filed Aug. 3, 2009, 9 pgs.

(56) References Cited

OTHER PUBLICATIONS

U.S. Appl. No. 10/956,667, Amendment and Response filed Sep. 22, 2008, 9 pgs.
U.S. Appl. No. 10/956,667, Notice of Allowance mailed Nov. 28, 2011, 5 pgs.
U.S. Appl. No. 10/956,667, Notice of Allowance mailed Feb. 28, 2011, 4 pgs.
U.S. Appl. No. 10/956,667, Notice of Allowance mailed May 6, 2011, 8 pgs.
U.S. Appl. No. 10/956,667, Notice of Allowance mailed Aug. 18, 2011, 5 pgs.
U.S. Appl. No. 10/956,667, Notice of Allowance mailed Aug. 30, 2010, 4 pgs.
U.S. Appl. No. 10/956,667, Office Action mailed Nov. 6, 2009, 8 pgs.
U.S. Appl. No. 10/956,667, Office Action mailed Dec. 8, 2008, 7 pgs.
U.S. Appl. No. 10/956,667, Office Action mailed Feb. 17, 2010, 6 pgs.
U.S. Appl. No. 10/956,667, Office Action mailed May 1, 2009, 7 pgs.
U.S. Appl. No. 10/956,667, Office Action mailed May 21, 2008, 6 pgs.
U.S. Appl. No. 10/956,667, Office Action mailed Jun. 9, 2010, 6 pgs.
U.S. Appl. No. 10/957,029, Advisory Action mailed Oct. 20, 2008, 3 pgs.
U.S. Appl. No. 10/957,314, Amendment and Response filed Jan. 17, 2008, 10 pgs.
U.S. Appl. No. 10/957,314, Amendment and Response filed Jan. 19, 2010, 10 pgs.
U.S. Appl. No. 10/957,314, Amendment and Response filed Dec. 30, 2008, 6 pgs.
U.S. Appl. No. 10/957,314, Amendment and Response filed Feb. 25, 2009, 10 pgs.
U.S. Appl. No. 10/957,314, Amendment and Response filed May 27, 2010, 9 pgs.
U.S. Appl. No. 10/957,314, Amendment and Response filed Aug. 12, 2008, 11 pgs.
U.S. Appl. No. 10/957,314, Amendment and Response filed Aug. 27, 2009, 8 pgs.
U.S. Appl. No. 10/957,314, Notice of Allowance mailed Aug. 4, 2010, 8 pgs.
U.S. Appl. No. 10/957,314, Office Action mailed Oct. 17, 2007, 13 pgs.
U.S. Appl. No. 10/957,314, Office Action mailed Oct. 27, 2008, 13 pgs.
U.S. Appl. No. 10/957,314, Office Action mailed Nov. 13, 2009, 13 pgs.
U.S. Appl. No. 10/957,314, Office Action mailed Apr. 1, 2010, 5 pgs.
U.S. Appl. No. 10/957,314, Office Action mailed May 12, 2008, 21 pgs.
U.S. Appl. No. 10/957,314, Office Action mailed May 27, 2009, 13 pgs.
U.S. Appl. No. 10/956,215, Office Action mailed Jun. 26, 2008, 20 pgs.
U.S. Appl. No. 10/956,215, Office Action mailed May 27, 2009, 21 pgs.
U.S. Appl. No. 10/956,215, Office Action mailed Oct. 26, 2007, 16 pgs.
U.S. Appl. No. 10/956,215, Office Action mailed Oct. 31, 2008, 16 pgs.
U.S. Appl. No. 10/956,215, Amendment and Response filed Sep. 26, 2008, 15 pgs.
U.S. Appl. No. 10/956,215, Amendment and Response filed Aug. 27, 2009, 13 pgs.
U.S. Appl. No. 10/956,215, Amendment and Response filed Mar. 26, 2008, 15 pgs.
U.S. Appl. No. 10/956,215, Amendment and Response filed Mar. 2, 2009, 16 pgs.
U.S. Appl. No. 10/957,029, Office Action mailed Feb. 5, 2010, 5 pgs.
U.S. Appl. No. 10/957,029, Office Action mailed Mar. 5, 2009, 18 pgs.
U.S. Appl. No. 10/957,029, Office Action mailed Nov. 14, 2007, 16 pgs.
U.S. Appl. No. 10/957,029, Notice of Allowance mailed Aug. 23, 2010, 10 pgs.
U.S. Appl. No. 10/957,029, Amendment and Response filed Sep. 23, 2008, 12 pgs.
U.S. Appl. No. 10/957,029, Amendment and Response filed Dec. 15, 2009, 12 pgs.
U.S. Appl. No. 10/957,029, Amendment and Response filed May 5, 2010, 9 pgs.
U.S. Appl. No. 10/957,029, Amendment and Response filed Jun. 5, 2009, 13 pgs.
U.S. Appl. No. 10/957,029, Amendment and Response filed Mar. 14, 2008, 13 pgs.
U.S. Appl. No. 10/957,029, Office Action mailed Jun. 23, 2008, 17 pgs.
U.S. Appl. No. 10/957,029, Office Action mailed Sep. 15, 2009, 26 pgs.
U.S. Appl. No. 10/957,509, Office Action mailed May 14, 2008, 22 pgs.
U.S. Appl. No. 10/957,509, Non-Final Office Action mailed Nov. 2, 2007, 30 pgs.
U.S. Appl. No. 10/957,509, Notice of Allowance mailed Oct. 3, 2008, 8 pgs.
U.S. Appl. No. 10/957,509, Amendment and Response filed Aug. 14, 2008, 11 pgs.
U.S. Appl. No. 10/957,509, Amendment and Response filed Feb. 4, 2008, 18 pgs.
U.S. Appl. No. 12/348,649, Office Action mailed May 12, 2010, 5 pgs.
U.S. Appl. No. 12/348,649, Office Action mailed Oct. 29, 2009, 21 pgs.
U.S. Appl. No. 12/348,649, Amendment and Response filed in Aug. 4, 2010, 10 pgs.
U.S. Appl. No. 12/348,649, Amendment and Response filed Jan. 29, 2010., 13 pgs.
U.S. Appl. No. 12/348,649, Notice of Allowance mailed Sep. 20, 2010, 7 pgs.
Japanese Notice of Rejection in Application 2011220995, mailed Dec. 22, 2011, 4 pgs.
Japanese Notice of Rejection in Application 2011220996, mailed Dec. 22, 2011, 9 pgs.
U.S. Appl. No. 10/956,215, Notice of Allowance mailed Jan. 5, 2010, 6 pgs.
US Notice of Allowance mailed Dec. 18, 2012, in U.S. Appl. No. 13/273,088 (5 pages).
U.S. Appl. No. 13/273,088, Office Action mailed Jun. 12, 2012, 6 pgs.
U.S. Appl. No. 13/273,088, Amendment and Response filed Sep. 6, 2012, 7 pgs.
U.S. Appl. No. 13/273,088, Notice of Allowance mailed Sep. 19, 2012, 5 pgs.
Japanese Final Rejection in Application 2011-220994, mailed Sep. 25, 2012, 6 pgs.
Japanese Final Rejection in Application 2011220995, mailed Apr. 13, 2012, 7pgs.
Japanese Notice of Allowance in Application 2011220995, mailed Aug. 7, 2012, 6 pgs.
Japanese Final Notice on Rejection in Application 2011220996, mailed Apr. 13, 2012, 11 pgs.
Japanese Final Rejection in Application 2011220996, mailed Aug. 7, 2012, 6pgs.
Canadian Application 2518004, Office Action mailed Jan. 14, 2013 (2 pages).
Appeal in response to the European Oral Summons in Application 05108532.2, mailed Aug. 2, 2013, 2 pgs.
Canadian Office Action in Application 2518004, mailed Jan. 14, 2013, 2 pgs.
European Oral Summons in Application 05108532.2, mailed Jul. 24, 2013, 7 pgs.
U.S. Appl. No. 13/890,965, Office Action mailed Aug. 7, 2014, 7 pgs.

\* cited by examiner ated using a particular word processing program. In order to satisfy this expectation, a conventional access control security system grants all programs running in the users context permission to access to all of the aforementioned word processing documents. This is a grant of an excess level of permission, however, because few programs running in the user context other than the word processing program actually need to access to any of the word processing documents.

ACCESS AUTHORIZATION HAVING EMBEDDED POLICIES

CROSS REFERENCE TO RELATED APPLICATION

This application is a continuation application of U.S. patent application Ser. No. 10/956,667, filed on Oct. 1, 2004, and entitled "ACCESS AUTHORIZATION HAVING EMBEDDED POLICIES," now U.S. Pat. No. 8,181,219, which is incorporated herein by reference in its entirety.

TECHNICAL FIELD

The described technology is directed to computer security and, more particularly, to controlling access to resources on a computer system.

BACKGROUND

As dependence on computers and computer networks increases along with the sophistication and the frequency of attacks on computers and computer networks, the subject of computer security is becoming ever more prominent in the industry. Current computer security techniques are inadequate in protecting application programs and operating systems from malicious software ("malware")—e.g., viruses, worms, and trojans—designed specifically damage or disrupt a computer system, and other undesirable activity.

Existing access control security models typically rely on a users credentials to authorize access to resources on a computer. In these models, every process that runs or executes with the same credentials is given the same access rights, whether or not the process needs access to all the resources that is available to the user. Also, a process that needs access to a resource, e.g., to read, write, etc., specifies the required access at the time the resource is accessed.

For example, a user logs on to a personal computer with a user account, and expects to be able to access all word processing documents stored on the personal computer and created using a particular word processing program. In order to satisfy this expectation, a conventional access control security system grants all programs running in the users context permission to access to all of the aforementioned word processing documents. This is a grant of an excess level of permission, however, because few programs running in the user context other than the word processing program actually need to access to any of the word processing documents.

Typically, malware infects processes by exploiting code defects. Once malware runs inside of a compromised process, it inherits the access rights of the user context in which the process is running, and gets access to all resources that are available to the user, which might be far greater than what the original process ever needed.

Accordingly, an integrated approach to access authorization that improves and enhances the security of resources on a computer will have significant utility.

DETAILED DESCRIPTION

Figure 1:
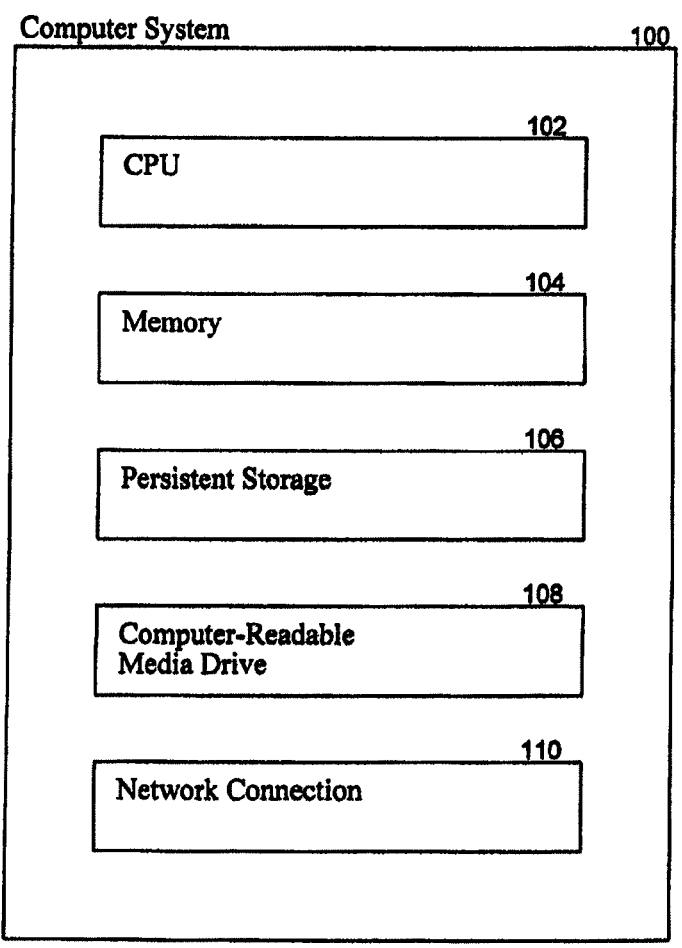
FIG. 1 is a block diagram illustrating selected components typically incorporated in at least some of the computer systems on which the facility executes.

A software facility ("facility") for protecting a computer system from the adverse effects arising from exploits against application and operating system programs on the computer system is described. In some embodiments, the facility adds a logic-driven access control layer to the operating system. The facility may provide an authorization module that receives authorization queries for various security-sensitive resource accesses and returns a decision to allow or deny a resource access based on a policy. A policy is a set of rules and practices that determine how a resource—such as, by way of example, a network, a file system, an application program, etc.—is managed and protected.

The authorization module may be queried directly by the various operating system components that service resource access requests issued by user mode programs, e.g., application programs executing in a user context. Alternatively, the authorization module may be queried by an "interception layer" sitting on top of such operating system components. The interception layer is code that intercepts the system call functions used by the user mode programs to access the resources, and applies "wrappers" to the intercepted system call functions. The authorization module makes its access control decisions (i.e., allow or deny) based on an identity of a principal, which is either the identity of the application program—e.g., application process—attempting the resource access, the identity of a user, or a combination of the identity of the application program and the identity of the user on whose behalf the application program is executing; a policy that applies to the principal; and the identity of the resource and action that the principal seeks to perform.

In some embodiments, the facility enables a policy, e.g., access restrictions, to be a part of the software comprising the application program. Here, it is expected that the operating system, or other comparable program or process, would or will recognize the presence of the policy embedded in the application program, extract the policy, and apply the policy. This may be accomplished, for example, by placing a special flag in the code to inform the operating system of the presence of the embedded policy, by a key set in the registry by the application's installer, by a new field in the portable executable header field of the application program, and by other methods of delimiting the embedded policy within the application code and signifying the presence of the embedded policy within the application code. The embedded policy is extracted from the software and enforced before the code comprising the application starts executing.

The embedded policy may be in the form of explicit rules or access restrictions declared in a human-readable format, such as XML. Alternatively, the embedded policy may be coded, e.g., using a programming language, and executed by an operating system access control service. By way of example, a policy may be embedded in the code and delivered with the application program when (1) dynamic policies are not required and the application program will not at any point request the facility to invoke a new policy, or (2) to retrofit a legacy application program. Thus, if the code has defects exploited by malicious code, the attack damage can be greatly reduced and contained.

In some embodiments, the application program code may be signed to protect both the application program code and the embedded policy. The application loader, e.g., longhorn loader, checks the integrity of the signed images before the code is loaded, and loads the application program images only if the signature matches the contents.

In some embodiments, a policy for an application program may be delivered by a program other than the application program to which the policy applies. For example, a policy for an application program may be delivered by an installer program for the application program. The installer program can deliver the policy for the application program to a central policy repository, where the policy is associated with the application program. The policy in the repository may then be applied before the corresponding application program is loaded and/or executed. In this manner, a policy for an existing or legacy application program can be delivered and applied without altering the legacy application program.

The various embodiments of the facility and its advantages are best understood by referring to FIGS. 1-17 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which the facility executes. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures.

The facility may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the facility.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the facility, it will be appreciated that the facility may be implemented using devices of various types and configurations, and having various components.

Figure 2:
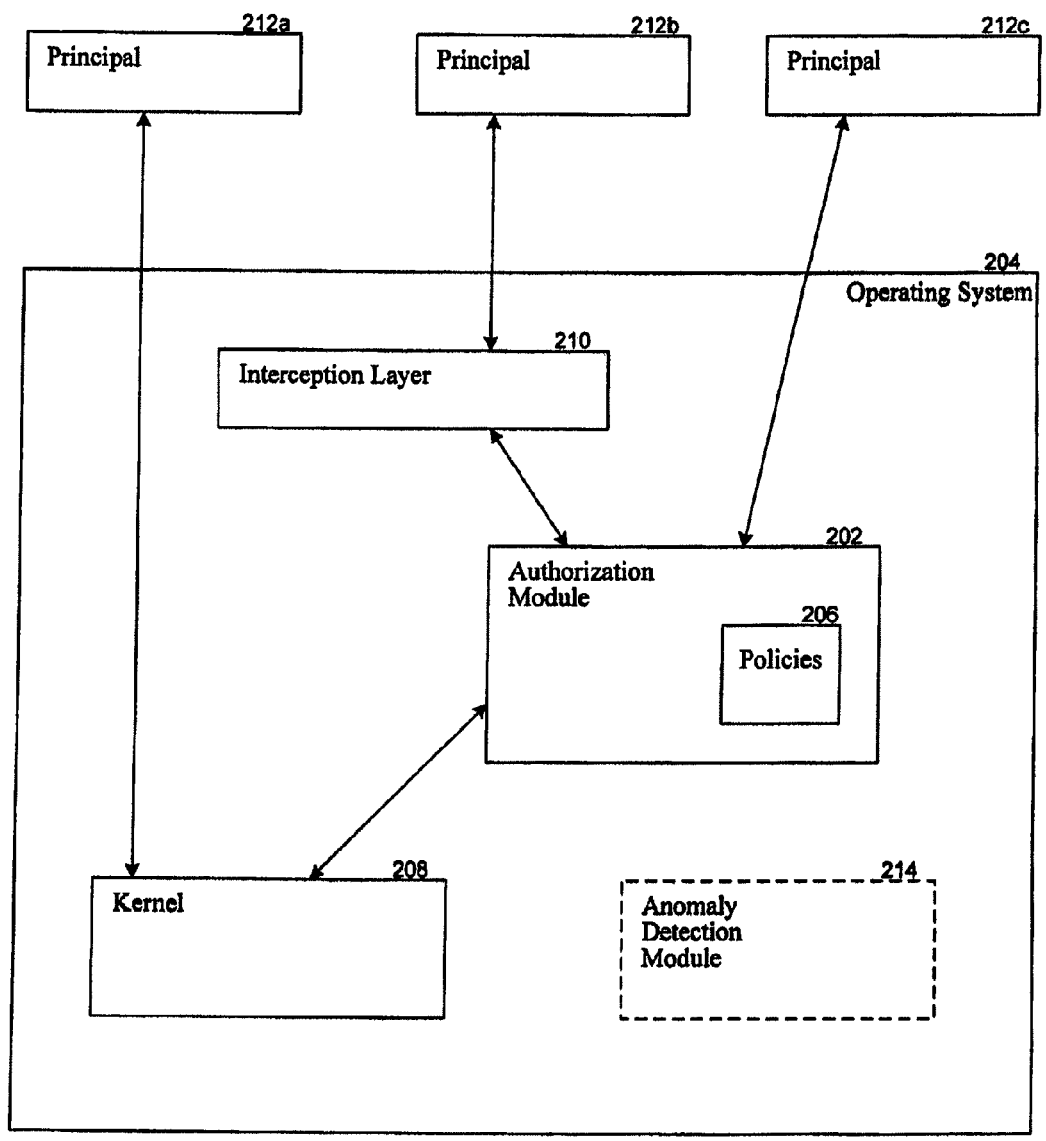
FIG. 2 is a block diagram illustrating selected components of the facility, according to some embodiments.

FIG. 2 is a block diagram illustrating selected components of the facility, according to some embodiments. As illustrated in FIG. 2, the facility includes an authorization module 202 which is implemented as an integral component of an operating system 204 suitable for executing on computer system 100. Authorization module 202 generally functions as an added protection layer to high risk processes such as network facing applications, network facing services and operating system components, applications dealing with untrusted content, and untrusted code, e.g., typically, code delivered via the Internet. Authorization module 202 provides the logic for performing the policy driven access control of the resources available on computer system 100.

The facility also includes policies 206 from which authorization module 202 makes its access control decisions. Policies 206 are the rules that determine whether to allow or deny a request for authorization to access a resource. In some embodiments, policies 206 get compiled into runtime—e.g., binary—rules that get enforced by operating system 204 and, in particular, authorization module 202. In some embodiments, policies 206 are implemented as part of a centralized policy store, which allows policies 206, including the rules in the policies 206, to be revoked centrally and set centrally, for example, by users and/or administrators.

Authorization module 202 may be queried by the various operating system kernel components 208 that service resource access requests issued by a principal, e.g., a principal 212a. Authorization module 202 may also be queried by an interception layer 210 that intercepts the system call functions issued by a principal, e.g., a principal 212b, to access the resources. Interception layer 210 applies wrappers to the intercepted system call functions to enable authorization module 202 to perform the access control check against the applicable policy 206. For example, applying a wrapper may include determining the identity of the principal and/or various environmental factors associated with computing system 100 and providing this information as part of a request for authorization to perform a system call to authorization module 202 to enable it to perform the access control check. Moreover, authorization module 202 may directly be queried by a principal, e.g., a principal 212c.

In some embodiments, the access control check performed by authorization module 202 is a function of a principal making the resource access request and a policy that applies to the principal. As such, authorization module 202 makes its access control decisions (i.e., allow or deny) based on an identity of, a principal—either the identity of a calling application program, or the combination of the identity of the calling application program and the identity of a user on whose behalf the application program is executing—and the rules in the policy that are applicable to the principal. In some embodiments, authorization module 202 may additionally consider parameters, such as, by way of example, type of access requested, environmental factors—e.g., is the computer on which the application program is executing inside a corporate network or connected to a public network, patch level of the computer, etc.—in addition to the identity of the principal and the rules in the policy that are applicable to the principal in making its access control decision.

In some embodiments, the facility may include an optional anomaly detection module 214 as depicted by the broken or "dashed" lines in FIG. 2. Anomaly detection module 214 generally functions to monitor the behavior of computer system 100 and the programs executing on computer system 100 in order to detect an anomalous state. In some embodiments, anomaly detection module 214 provides the facility a first notification upon detecting an anomaly and a subsequent, second notification upon detecting the cessation of the previously detected anomaly. This enables the facility to activate the enforcement of policies 206 upon detection of an anomaly, until the anomaly has ended and policies 206 are no longer enforced. Alternatively, the facility may initially impose a less restrictive set of policies until an anomaly is detected, in which case a more restrictive set of policies are enforced, until the anomaly has ended and the less restrictive set of policies are again enforced. Anomaly detection module 214 may detect an anomaly in either a single process executing on computer system 100, a group of processes executing on computer system 100, or the entire computer system 100.

The aforementioned, aspects of the facility are only illustrative and are not intended to suggest any limitation as to the implementation of the illustrated components and/or the scope of use or functionality of the facility. For example, in some embodiments, authorization module 202 need not be implemented as part of or integral to operating system 204, but may be implemented separate of or outside operating system 204, for example, as a non-operating system program. Moreover, in some embodiments, policies 206 need not be implemented as or a part of a centralized policy store. Thus, policies 206 need not be in one place, but may be implemented using, for example, a distributed model. Furthermore, even though policies 206 are depicted as part of or contained in authorization module 202, policies 206 need only be accessible by authorization module 202.

In the discussion that follows, embodiments of facility are described in conjunction with a variety of illustrative examples. It will be appreciated that the embodiments of facility may be used in circumstances that diverge significantly from these examples in various respects.

Figure 3:
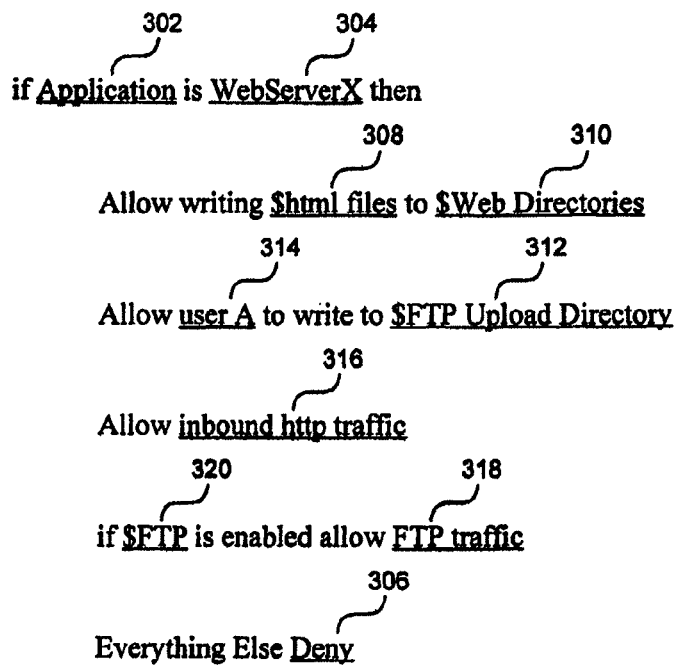
FIG. 3 illustrates an example policy suitable for use by the facility, according to some embodiments.

FIG. 3 illustrates an example policy suitable for use by the facility, according to some embodiments. The example policy includes the rules to protect a web server application. By way of example, an application process, as indicated by item 302, requesting a resource is checked to determine if it is a WebServerX web server process, as indicated by item 304. If authorization module 202 determines that the requesting application process is a WebServerX web server process, authorization module 202 either allows or denies authorization for the requested resource based on the rules included in the policy.

As illustrated, the example policy contains the privileges or access rights granted to a WebServerX process, and the default is to deny authorization for the requested resource, as indicated by rule 306, unless the privilege or access right is specified. Stated another way, unless the requested resource is explicitly granted in the policy, authorization for the requested resource is denied. In some embodiments, the policy may contain rules that specify access restrictions, e.g., rules that specify that authorization to perform particular actions be denied or that deny authorization to access resources, or rules that cause an audit, e.g., log an event.

The first rule in the example policy is a directive to permit the WebServerX process to write "$html" files, as indicated by item 308, to "$WebDirectories," as indicated by item 310. The "$html" is a representation of a collection of file types, for example, *.html, *.gif, etc. The "$WebDirectories" is a representation of a collection of directories configured to be web directories, and may be defined by an administrator, such as a web administrator, who is different than the creator of the policy, such as a security administrator. For example, authorization module 202 returns an allow decision (i.e., grant of authorization) based on this rule in response to a WebServerX process requesting to write a file of a type defined by the parameter "$html" to one of the directories defined by the parameter "$WebDirectories." Thus, a rule in the policy may apply to dynamic, independently defined groups of objects, such as "$WebDirectories," and dynamically configurable environment parameters, such as "$html."

The second rule in the example policy is a directive to permit the WebServerX process to write to the "$FTP Upload Directory," as indicated by item 312, if it is executing on behalf of "user A," as indicated by item 314. For example, authorization module 202 returns an allow decision (i.e., grant of authorization) based on this rule in response to a WebServerX process executing on behalf of user A requesting to write to the "$FTP Upload Directory."

The third rule in the example policy is a directive to permit inbound http traffic, as indicated by item 316. For example, authorization module 202 returns an allow decision (i.e., grant of authorization) based on this rule in response to a WebServerX process requesting to receive inbound http data, e.g., receive http data packets transmitted over a network connection.

The fourth rule in the example policy is a directive to permit "FTP traffic," as indicated by item 318, if the variable "$FTP" is enabled, as indicated by item 320. Here, "$FTP" is a variable, and may be set by an administrator who is different than a security administrator who created the policy. For example, authorization module 202 performs a run-time check to determine if the variable "$FTP" is enabled, and if so, returns an allow decision (i.e., grant of authorization) based on this rule in response to a WebServerX process requesting to send or receive data defined by the parameter "FTP traffic." Alternatively, if the "$FTP" is not enabled, authorization module 202 will return a deny decision (i.e., denial of authorization) in response to the aforementioned access request as indicated by item 306.

It will be appreciated that the policy may include rules that define privileges for objects within and outside the operating system, such as application processes as illustrated by the example privilege above. The rules in a policy may be specified using a rich schema, similar to writing code using compiled or interpreted programming language. For example, the schema may support the inclusion of conditions and temporal conditions, e.g., "allow X only if Y," dependencies on dynamically configurable environment parameters and variables, dependencies on environmental factors, and the like, in the rules. Moreover, the use of parameters facilitates the creation of rules that apply to both present and future objects. For example, documents of a particular type may be represented by a parameter, and using the parameter, a rule can be created that specifies a restriction that applies to all documents of that particular type, whether currently in existence or later created. In some embodiments, the policy may specify that certain decisions are to be relegated to the end user for decision, for example, through a pop-up dialog box.

Figure 4:
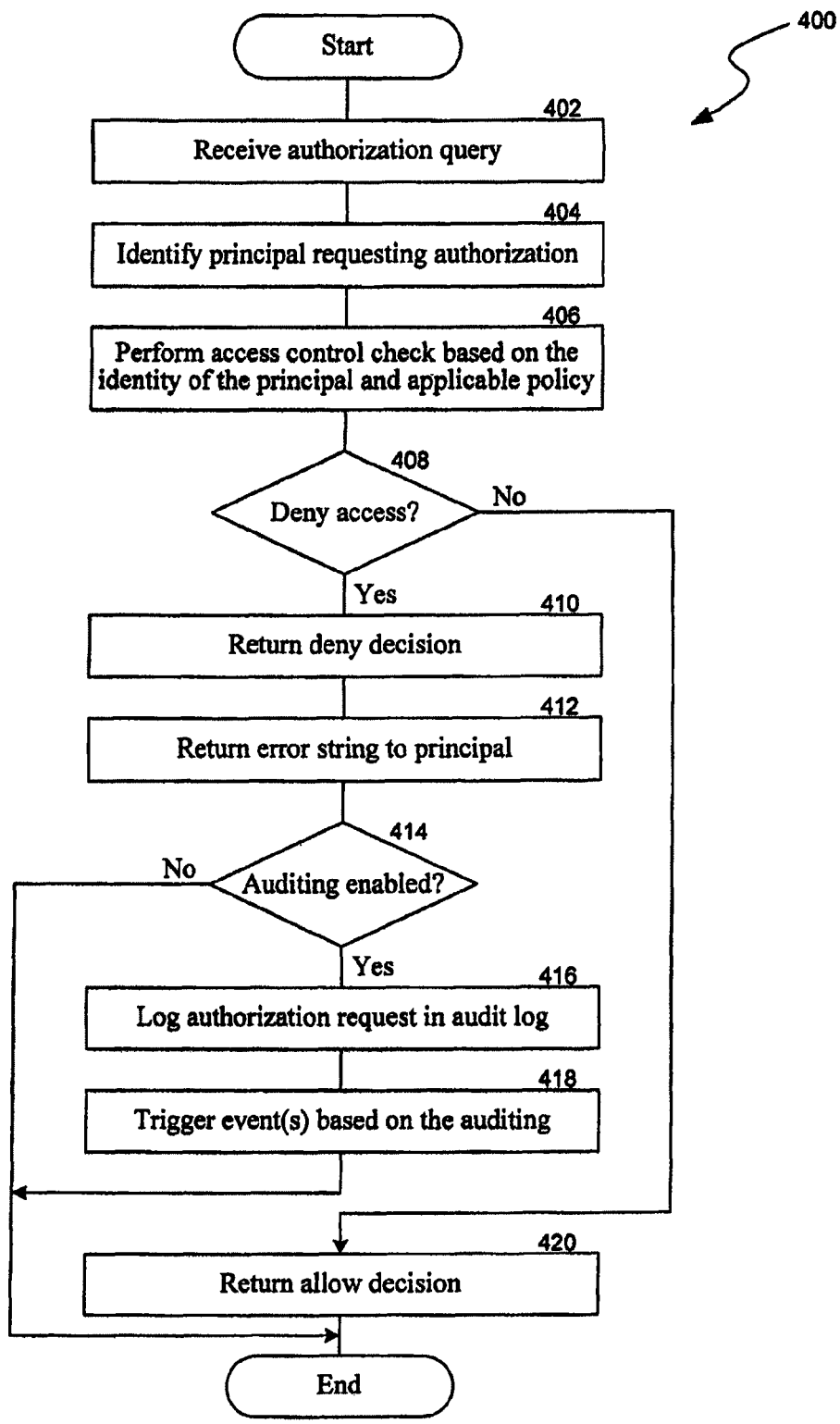
FIG. 4 illustrates a flow chart of a method by which the facility performs auditing of denied access requests, according to some embodiments.

FIG. 4 illustrates a flow chart of a method 400 by which the facility performs auditing of denied access requests, according to some embodiments. By way of example, a user (e.g., UserABC) may have logged on to a computer and started a word processing application (e.g., WPApp) and requested to open a file (e.g., FileX) stored in a directory (e.g., YZDir) on the computer. As a result, WPApp issues a request to access the resource FileX stored In directory YZDir. Beginning at a start step, authorization module 202 receives the authorization query, e.g., a request for authorization to access FileX stored in YZDir, at step 402.

At step 404, authorization module 202 identifies the principal that is requesting the authorization to access FileX stored in YZDir. In the above example, the principal may either be WPApp or the combination of WPApp and UserABC. At step 406, authorization module 202 identifies the policy applicable to the identified principal, for example, from a centralized policy store such as policies 206, and performs an access control check based on the identity of the principal and the applicable policy. At step 408, authorization module 202 determines whether the result of the access control check performed in step 406 is to deny access. Continuing the above example, authorization module 202 analyzes the identified applicable policy to determine whether a rule or privilege in the policy authorizes the principal to access FileX stored in YZDir, at step 408.

If authorization module 202 determines that the applicable policy authorizes the principal to perform the requested action, then at step 420, authorization module 202 returns an allow decision, which is an indication that the principal is authorized to perform the requested action, and proceeds to an end step. Alternatively, if authorization module 202 determines that the applicable policy does not authorize the principal to perform the requested action, then at step 410, authorization module 202 returns a deny decision, which is an indication that the principal is not authorized to perform the requested action. At step 412, authorization module 202 may return an error string to the principal, informing the principal of the lack of authorization to perform the requested action.

At step 414, authorization module 202 checks to determine whether auditing is enabled. A flag or a record associated with the applicable policy or rule may indicate whether to perform auditing. If auditing is not enabled, authorization module 202 proceeds to an end step. Alternatively, if auditing is enabled, authorization module 202 makes an entry in an audit log at step 416. The entry may identify the denied request, the failed rule, the principal, and/or the requested resource.

At step 418, authorization module 202 may trigger one or more events based on the auditing of the denied request. For example, authorization module 202 may provide a security administrator an indication, e.g., via email, voice mail, text messaging, etc., of the attempt by the principal to perform an unauthorized action, terminate the application process subsequent to the attempt by the principal to perform an unauthorized action, impose a stricter set of policies subsequent to the attempt by the principal to perform an unauthorized action, and the like. Subsequent to triggering the events, authorization module 202 proceeds to an end step.

Those of ordinary skill in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 5:
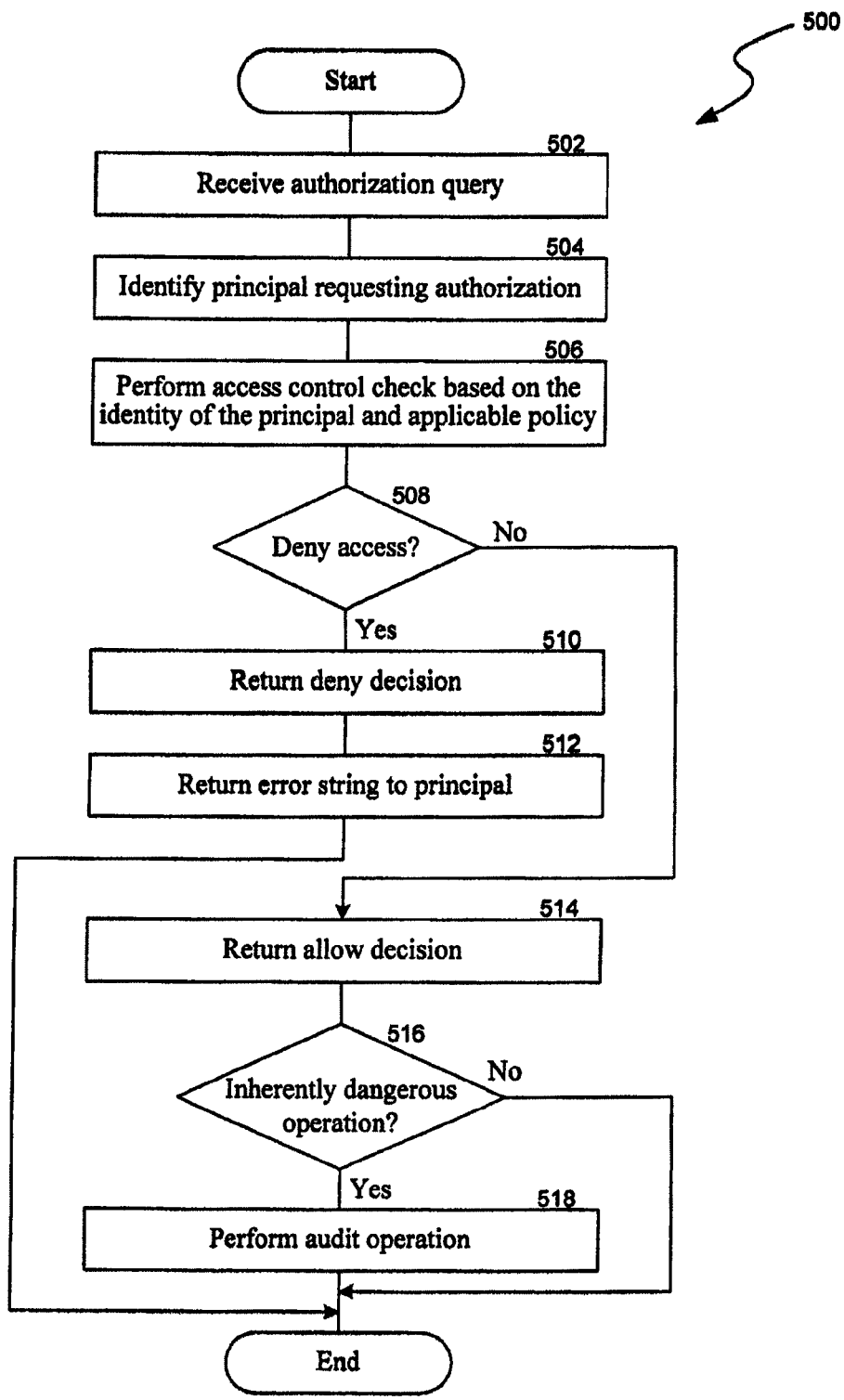
FIG. 5 illustrates a flow chart of a method by which the facility performs auditing of inherently dangerous operation's, according to some embodiments.

FIG. 5 illustrates a flow chart of a method 500 by which the facility performs auditing of inherently dangerous operations, according to some embodiments. By way of example, a user (e.g., UserABC) may have logged on to a computer and started a web browser program (e.g., WebBrowser) and requested to access a web page (e.g., PageX) on an untrusted web site (e.g., WebSiteY). As a result, WebBrowser issues a request to retrieve PageX from WebSiteY. Steps 502-508 are substantially similar to steps 402-408 of method 400.

If, at step 508, authorization module 202 determines that the applicable policy does not authorize the principal to perform the requested action, then at step 510, authorization module 202 returns a deny decision, which is an indication that the principal is not authorized to perform the requested action. In the above example, WebBrowser may not have authorization to access untrusted site WebSiteY. At step 512, authorization module 202 may return an error string to the principal, informing the principal of the lack of authorization to perform the requested action. Subsequent to returning an error string, authorization module proceeds to an end step.

Alternatively, if authorization module 202 determines that the applicable policy authorizes the principal to perform the requested action, then at step 514, authorization module 202 returns an allow decision, which is an indication that the principal is authorized to perform the requested action. At step 516, authorization module 202 checks to determine whether the authorized action is an inherently dangerous operation. For example, the facility may maintain a list of inherently dangerous operations, and authorization module 202 may check this list to determine if the authorized action is listed as an inherently dangerous operation.

If the authorized action is found to be an inherently dangerous operation, then at step 518, authorization module 202 performs an audit operation. For example, authorization module 202 may make an entry in an inherently dangerous operation audit log of an indication of the request and authorization to perform the inherently dangerous operation. The entry may also include an indication of the principal that requested the authorization to perform the inherently dangerous operation. Authorization module 202 may additionally perform other actions which may be triggered by the authorization to perform the inherently dangerous operation. Subsequent to performing the audit operation at step 518, or determining that the authorized action is not an inherently dangerous operation at step 516, authorization module 202 proceeds to an end step.

In some embodiments, authorization module 202 may make an entry in the inherently dangerous operation audit log of an indication of a request of authorization to perform an inherently dangerous operation. Continuing the above example, assuming that accessing untrusted site WebSiteY is indicated to be an inherently dangerous operation and, further, the applicable policy does not grant WebBrowser authorization to access WebSiteY, authorization module 202 returns a deny decision (step 510) and records the request for authorization to perform the inherently dangerous operation and the subsequent denial of authorization, for example, in the inherently dangerous operation audit log. Authorization module 202 may also record an indication of the principal that requested authorization to perform the inherently dangerous activity.

Figure 6:
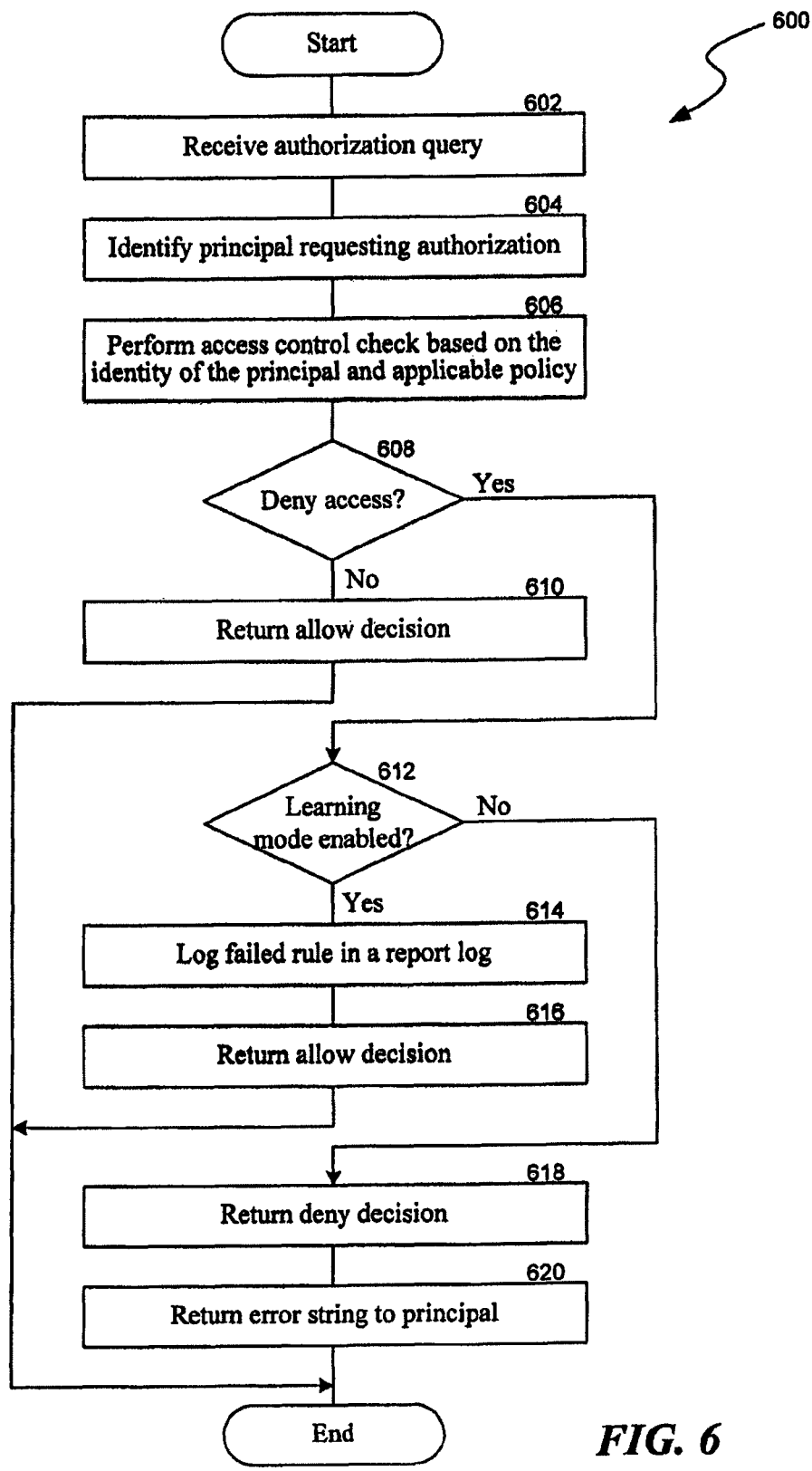
FIG. 6 illustrates a flow chart of a method by which the facility performs learning to facilitate fine-tuning of a policy, according to some embodiments.

FIG. 6 illustrates a flow chart of a method 600 by which the facility performs learning to facilitate fine-tuning of a policy, according to some embodiments. By way of example, a user (e.g., UserABC) may have logged on to a computer and started a web browser program (e.g., WebBrowser) and requested to access a web page (e.g., PageX) on a web site (e.g., WebSiteY). As a result, WebBrowser issues a request to retrieve PageX from WebSiteY. Steps 602-608 are substantially similar to steps 402-408 of method 400.

If, at step 608, authorization module 202 determines that the applicable policy authorizes the principal to perform the requested action, then at step 610, authorization module 202 returns an allow decision, which is an indication that the principal is authorized to perform the requested action, and proceeds to an end step. Alternatively, if authorization module 202 determines that the applicable policy does not authorize the principal to perform the requested action, then at step 612, authorization module 202 checks to determine whether learning is enabled for the rule in the policy that denies authorization to perform the requested action. Continuing the above example, a policy applicable to WebBrowser may contain a rule that expressly denies WebBrowser access to the Internet and, thus, WebSiteY, but, may also provide an indication to apply learning instead of applying the rule.

If authorization module 202 determines that learning is not enabled for the rule that denies authorization to perform the requested action, then at step 618, authorization module 202 returns a deny decision, which is an indication that the principal is not authorized to perform the requested action. In the above example, the rule that expressly denies WebBrowser access to the Internet and, thus, WebSiteY, may not have an indication to apply learning. In this instance, the rule is applied and WebBrowser is denied authorization to access WebSiteY. At step 620, authorization module 202 may return an error string to the principal, informing the principal of the lack of authorization to perform the requested action. Subsequent to returning an error string, authorization module proceeds to an end step.

Alternatively, if, at step 612, authorization module 202 determines that learning is enabled for the rule that denies authorization to perform the requested action, then at step 614, authorization module 202 makes an entry in a learning report log of an indication of the failed rule. The entry may also include an indication of the principal that requested the authorization to perform the action that resulted in the failed rule. At step 616, authorization module 202 returns an allow decision, which is an indication that the principal is authorized to perform the requested action, and proceeds to an end step. Thus, Instead of applying the applicable rule, authorization module 202 grants authorization to perform the requested action and records an indication of this event. A security administrator or other interested user can then analyze the contents of the learning report log to determine whether a rule or policy is too restrictive or not restrictive enough, and fine-tune the rule or policy before actually enforcing or implementing the rule or policy.

In some embodiments, authorization module 202 may make an entry in the learning report log of an indication of a rule that provided the authorization to perform a requested action. Continuing the above example, assuming that a rule expressly authorizes WebBrowser access to the Internet and, thus, WebSiteY, and also provides an indication to apply learning, authorization module 202 returns an allow decision (step 610) and records an indication of the rule that provided the authorization to perform the requested action. This information may also be used to fine-tune the rule or policy. For example, if it is determined from the entries in the report log that authorization to access a resource was too readily granted, the rule or policy may be adjusted or altered to reduce the instances where authorization to access to the resource is granted.

Figure 7:
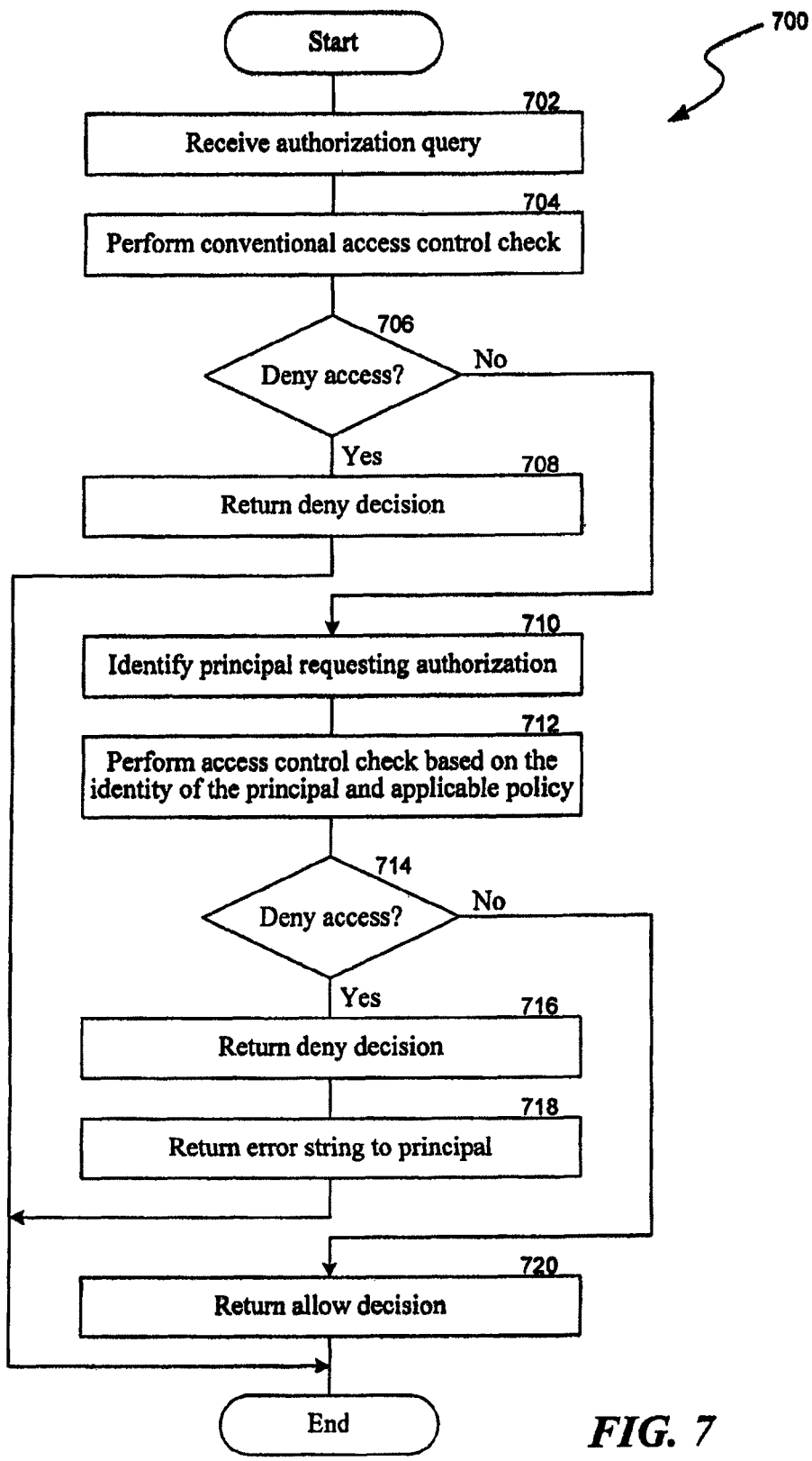
FIG. 7 illustrates a flow chart of a method by which the facility provides a tiered access control check, according to some embodiments.

FIG. 7 illustrates a flow chart of a method 700 by which the facility provides a tiered access control check, according to some embodiments. Referring again to one of the prior examples, a user (e.g., UserABC) may have logged on to a computer and started a word processing application (e.g., WPApp) and requested to open a file (e.g., FileX) stored in a directory (e.g., YZDIr) on the computer. As a result, WPApp issues a request to access the resource FileX stored in directory YZDir. Beginning at a start step, authorization module 202 receives the authorization query, e.g., a request for authorization to access FileX stored in YZDir, at step 702.

At step 704, an operating system running on the user's computer performs a conventional access control check. Continuing the above example, the operating system may check to determine whether the user has rights to open (e.g., read access) FileX in YZDir. At step 706, the operating system, using its conventional access check mechanism, determines whether to deny the user access to FileX.

If the operating system's conventional access check mechanism determines that the user should be denied access to FileX, then at step 708, the operating system returns a deny decision, and proceeds to an end step. The deny decision is an indication that the user is not authorized to perform the requested action, e.g., open FileX. Alternatively, if the operating system's conventional access check mechanism determines that the user should not be denied access to FileX, then at step 710, authorization module 202 identifies the principal that is requesting the authorization to access FileX stored in YZDir.

At step 712, authorization module 202 identifies the policy applicable to the identified principal, for example, from a centralized policy store such as policies 206, and performs an access control check based on the identity of the principal and the applicable policy. Continuing the above example, authorization module 202 analyzes the identified applicable policy to determine whether a rule or privilege in the policy authorizes the principal to access FileX stored in YZDir, at step 714.

If authorization module 202 determines that the applicable policy authorizes the principal to perform the requested action, then at step 720, authorization module 202 returns an allow decision, which is an indication that the principal is authorized to perform the requested action, and proceeds to an end step. Alternatively, if authorization module 202 determines that the applicable policy does not authorize the principal to perform the requested action, then at step 716, authorization module 202 returns a deny decision, which is an indication that the principal is not authorized to perform the requested action. At step 718, authorization module 202 may return an error string to the principal, and proceeds to an end step. The error string may inform the principal of the lack of authorization to perform the requested action.

It will be appreciated that the tiered access check may be performed in the reverse order from that illustrated by method 700. For example, authorization module 202 first performs its access control check. If authorization module 202 determines that authorization should be given for a particular resource access, then the operating system performs its security check using its conventional access control mechanism.

Figure 8:
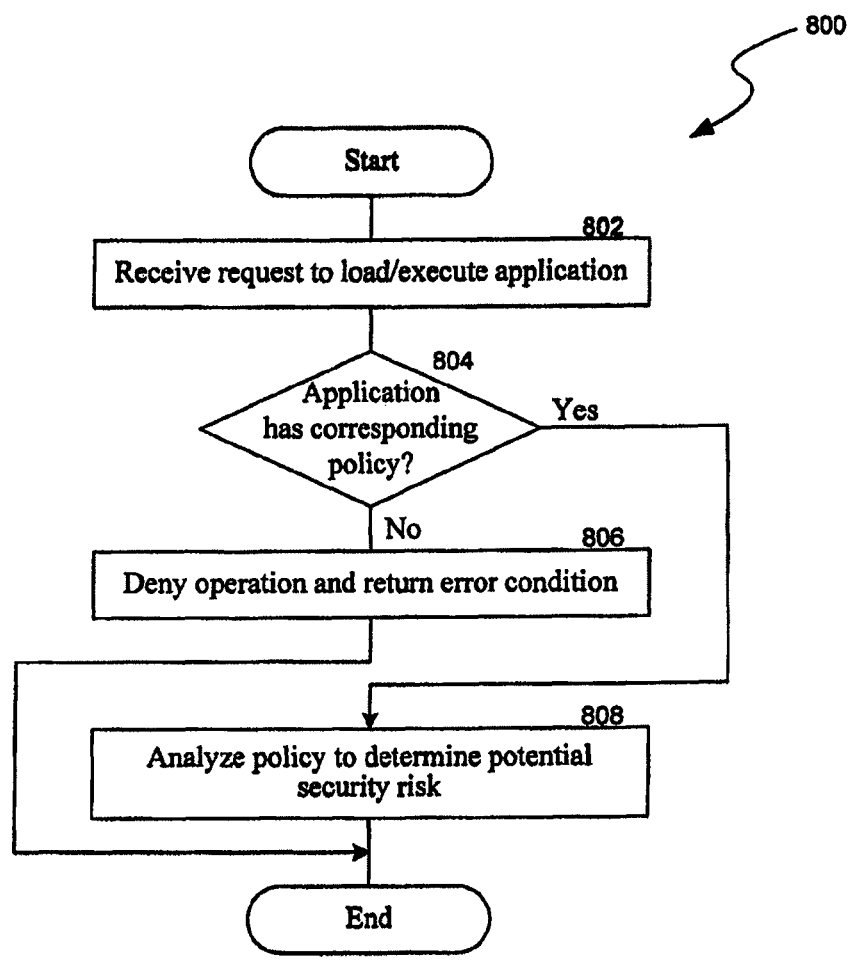
FIG. 8 illustrates a flow chart of a method by which the facility determines a level of security risk of an application program, according to some embodiments.

FIG. 8 illustrates a flow chart of a method 800 by which the facility determines a level of security risk of an application program, according to some embodiments. In particular, the facility makes an assessment of the level of security risk and/or intent of an application program based upon an analysis of a policy designated for the application program. By way of example, a user may have logged on to a computer and requested to load and/or execute an application program on the computer.

Beginning at a start step, an operating system running on the user's computer receives a request to load/execute the application program at step 802. At step 804, the operating system invokes the facility to determine whether the application program has a corresponding policy. For example, the policy applicable to the application program may be maintained as part of policies 206. If the facility determines that a policy applicable to the application program does not exist, the facility informs the operating system that an applicable policy does not exist. At step 806, the operating system denies the request to load/execute the application program and returns an error condition. Subsequent to denying the request, the operating system proceeds to an end step for this request.

Alternatively, if, at step 804, the facility determines that a policy applicable to the application program does exist, then at step 808, the facility analyzes the applicable policy to determine the level of potential security risk associated with or resulting from loading/executing the application program. The facility may base the level of risk on the level or extent of authorization granted by the rules in the policy. For example, if the rules authorize the application program to a lot of resources or a number of inherently dangerous resources, the facility may set the level of risk higher than if the rules only authorize the application program to a few, relatively safe resources. The facility informs the operating system that an applicable policy does exist, and proceeds to an end step.

Figure 9:
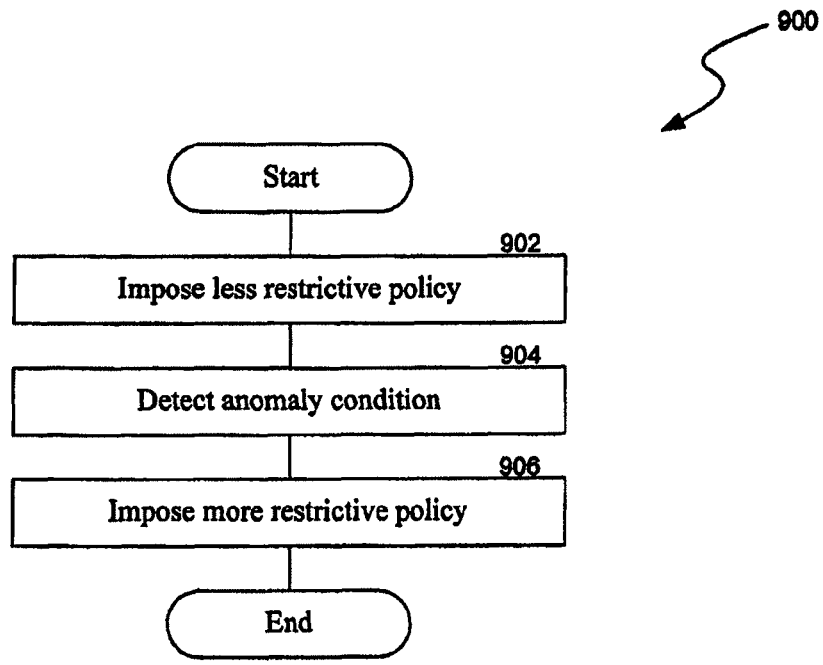
FIG. 9 illustrates a flow chart of a method by which the facility imposes a more restrictive policy upon detecting an anomaly, according to one embodiment.

FIG. 9 illustrates a flow chart of a method 900 by which the facility imposes a more restrictive policy upon detecting an anomaly, according to some embodiments. By way of example, the facility running on a computer may have two policies, a PolicyA and a PolicyB, which are applicable to an application program. Moreover, PolicyA may be less restrictive than PolicyB in that PolicyA grants authorization to a greater number of resources.

Beginning at a start step, the facility imposes the less restrictive PolicyA at step 902. At step 904, the facility may detect an anomalous state in an instance of the application program executing on the computer. Continuing the above example, an instance of the application program may be executing on the computer, and the facility may be monitoring the executing application program process. While monitoring the application program process, the facility may detect an anomalous condition or state in the process. For example, the facility may have previously generated a directed graph that represents the system calls normally issued by the application program by tracking previous instances of the application program that ran on the computer, and determined the presence of an anomalous state from a comparison of the system calls made by the current application program process and the directed graph.

At step 908, the facility imposes the more restrictive PolicyB in response to detecting the anomalous state, and proceeds to an end step. In one embodiment, the facility imposes the more restrictive PolicyB on the application program process in which the anomalous state was detected. Alternatively, the facility may impose the more restrictive PolicyB on the application program, e.g., all instances or processes of the application program. Moreover, depending on the detected anomaly, the application program, and/or the particular policy, the facility may impose a set of more restrictive policies on the entire computer, e.g., more restrictive policies are applied to all processes executing on the computer.

Figure 10:
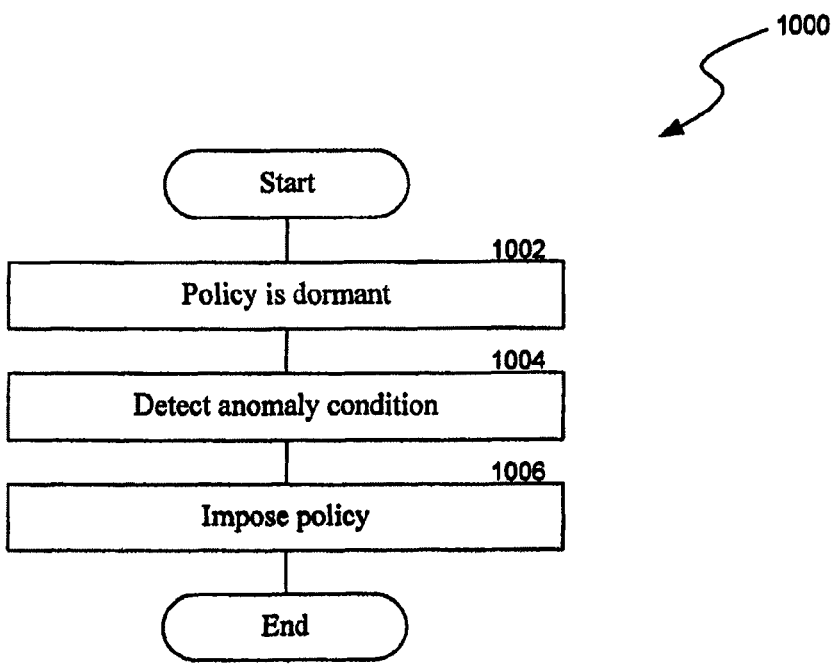
FIG. 10 illustrates a flow chart of a method by which the facility imposes a policy upon detecting an anomaly, according to some embodiments.

FIG. 10 illustrates a flow chart of a method 1000 by which the facility imposes a policy upon detecting an anomaly, according to some embodiments. By way of example, the facility running on a computer may have a policy, PolicyA, which is applicable to a web application program. Beginning at a start step, the facility does not impose the policy on the web application program at step 1002. Thus, PolicyA is dormant and not applied to the instances of the web application program executing on the computer. At step 1004, the facility may detect an anomalous state in an instance of the web application program executing on the computer.

Continuing the above example, an instance of the web application program may be executing on the computer, and the facility may be monitoring the executing web application program process. While monitoring the application program process, the facility may detect an anomalous condition or state in the process. For example, the facility may monitor the network traffic generated or caused by the web application process and determine from the network traffic that an anomalous state is present in the web application process. At step 1006, the facility imposes the dormant policy, PolicyA, on the web application program, for example, on the web application program process in which the anomaly was detected, and proceeds to an end step. Alternatively, the facility may impose PolicyA on all instances or processes of the web application program. Thus, the dormant policy becomes active and applied to the web application program.

Figure 11:
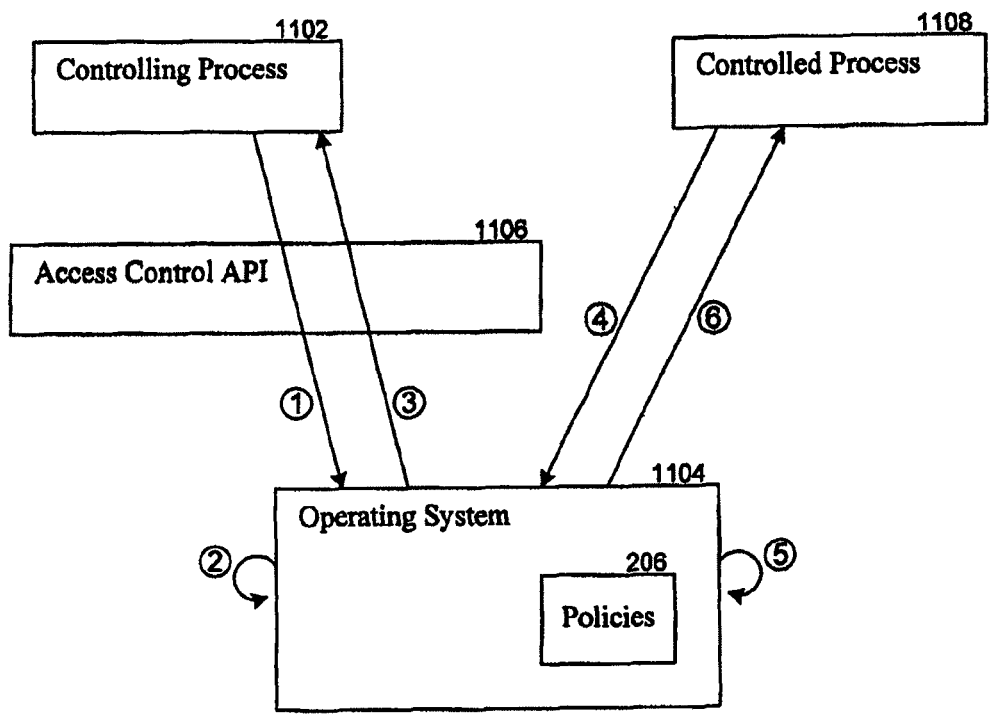
FIG. 11 is a block diagram illustrating a communications flow used by the facility in some embodiments to set a policy on a target process.

FIG. 11 is a block diagram illustrating a communications flow used by the facility in some embodiments to set a policy on a target process. By way of example, a network server process executing on a computer may want to set a policy for a listener process that is configured to listen for and receive network packets on behalf of the server process. In this instance, the server process may be considered a controlling process, and the listener process may be considered a target or controlled process.

As illustrated in FIG. 11, a controlling process 1102 sends a request to set a policy on a controlled process 1108 to operating system 1104 running on the computer (Stage 1). The policy may be sent with the request or may have been previously sent, in which case the request may include an identifier that identifies the policy. The request is made through an access control API 1106. Access control API 1106 generally functions to expose and make available various interfaces that may be used by application developers to set and revoke, policies. In one embodiment, access control API 1106 provides the calling conventions by which an application program accesses operating system 1104 to set and revoke policies.

In response to receiving the request to set a policy, operating system 1104 checks to determine whether controlling process 1102 possesses adequate privilege to set a policy on a target process (Stage 2). For example, operating system 1104 may require controlling process 1102 to be executing at a higher privilege level than the privilege level controlled process 1108 will be executing at. Alternatively, operating system 1104 may only allow a process to set a policy on a child process. If operating system 1104 determines that controlling process 1102 has adequate privilege, then operating system 1104 sets the policy on controlled process 1108. If the request includes the policy, operating system 1104 stores the received policy in, for example, policies 206, and sets an indication to apply the policy. If the request includes an identifier identifying the policy, operating system 1104 uses the identifier to identify, e.g., locate, the policy in, for example, policies 206, and sets an indication to apply the policy. Otherwise, if operating system 1104 determines that controlling process 1102 does not have adequate privilege, then operating system 1104 does not set the policy on controlled process 1108. Operating system 1104 returns to controlling process 1102 the results of the request to set a policy on controlled process 1108 (Stage 3).

Subsequently, when controlled process 1108 makes a request to access a resource to operating system 1104 (Stage 4), operating system 1104 performs an access control check to determine whether controlled process 1108 has authorization to access the resource (Stage 5). For example, operating system 1104 may utilize authorization module 202 to determine whether there is an applicable policy and apply the rules in the applicable policy to determine whether controlled process 1108 has authorization to access the resource.

Depending on the results of the access control check operating system 1104 services the request to access the resource. For example, if operating system 1104 determines by applying the applicable policy that controlled process 1108 has authorization to access the resource, operating system 1104 proceeds to further process the request to access the resource. Otherwise, operating system 1104 does not further process the request to access the resource. Operating system 1104 returns to controlled process 1108 the results of the request to access the resource (Stage 6).

Even though controlling process 1102 and operating system 1104 are depicted as running on the same computer in the above and subsequent examples, it is not meant to be limiting as those of skill in the art will appreciate that controlling process 1102 need not be running on the same computer as operating system 1104. For example, the request to set the policy may be sent over a communications network. Additionally, it will also be appreciated that controlled process 1108 may or may not be in existence at the time of the request to set a policy on controlled process 1108.

Figure 12:
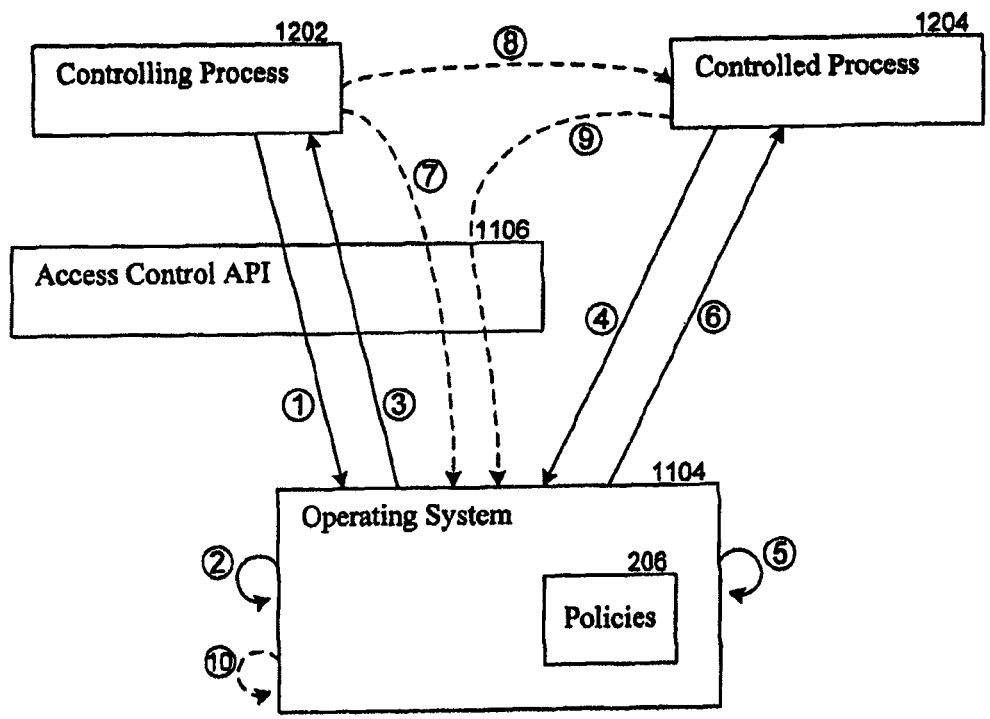
FIG. 12 is a block diagram illustrating a communications flow used by the facility in some embodiments to set a revocable policy on a target process.

FIG. 12 is a block diagram illustrating a communications flow used by the facility in some embodiments to set a revocable policy on a target process. A controlling process 1202 sends, via access control API 1106, a request to set a revocable policy on a controlled process 1204 to operating system 1104 running on a computer (Stage 1). In response to receiving the request to set a revocable policy, operating system 1104 checks to determine whether controlling process 1202 possesses adequate privilege to set a revocable policy on a target process (Stage 2). If operating system 1104 determines that controlling process 1202 has adequate privilege, then operating system 1104 sets an indication to apply the policy on controlled process 1204. Otherwise, if operating system 1104 determines that controlling process 1202 does not have adequate privilege, then operating system 1104 does not set the policy on controlled process 1204.

Operating system 1104 returns to controlling process 1202 the results of the request to set a revocable policy on controlled process 1204 (Stage 3). If the revocable policy was successfully set, operating system 1104 returns an identifier in, for example, a "cookie" to controlling process 1202. In one embodiment, the identifier authenticates the process that set the revocable policy, and is used to identify and revoke the revocable policy. Stated another way, the identifier is akin to a privilege or authorization to revoke the revocable policy, and is subsequently submitted to operating system 1104 with a request to revoke the policy. In other embodiments, the cookie may also include state information, such as an identifier that identifies a policy that was previously in effect.

Subsequently, when controlled process 1204 makes a request to access a resource to operating system 1104 (Stage 4), operating system 1104 performs an access control check to determine whether controlled process 1204 has authorization to access the resource (Stage 5). Depending on the results of the access control check, operating system 1104 services the request to access the resource. For example, if operating system 1104 determines by applying the applicable policy that controlled process 1204 has authorization to access the resource, operating system 1104 proceeds to further process the request to access the resource. Otherwise, operating system 1104 does not further process the request to access the resource. Operating system 1104 returns to controlled process 1204 the results of the request to access the resource (Stage 6).

Controlling process 1202 may then send, via access control API 1106, a request to revoke a revocable policy previously set on controlled process 1204 to operating system 1104 (Stage 7). Alternatively, controlling process 1202 may send the cookie containing the identifier to controlled process 1204 (Stage 8), and controlled process 1204 may subsequently send, via access control API 1106, a request to revoke a revocable policy previously set on controlled process 1204 to operating system 1104 (Stage 9). In both instances, the cookie is sent with the request to revoke a revocable policy.

In response to receiving the request to revoke a revocable policy, operating system 1104 uses the identifier contained in the cookie to authenticate the requestor as a process having authorization to revoke the indicated revocable policy. Operating system 1104 may also use the identifier to identify the policy that is to be revoked. Subsequent to authenticating the requestor—either controlling process 1202 (Stage 7) or controlled process 1204 (Stage 9), —operating system 1104 revokes the revocable policy currently being applied to controlled process 1202. In another embodiment, operating system 1104 may apply a policy that was being applied to controlled process 1204 prior to the application of the just revoked revocable policy. For example, an identifier that identifies the policy that was previously in effect may be passed to operating system 1104 in the cookie that was sent with the request to revoke a revocable policy. Alternatively, operating system 1104 may have preserved the state information prior to applying the revocable policy, for example, in a persistent storage device on the computer.

Figure 13:
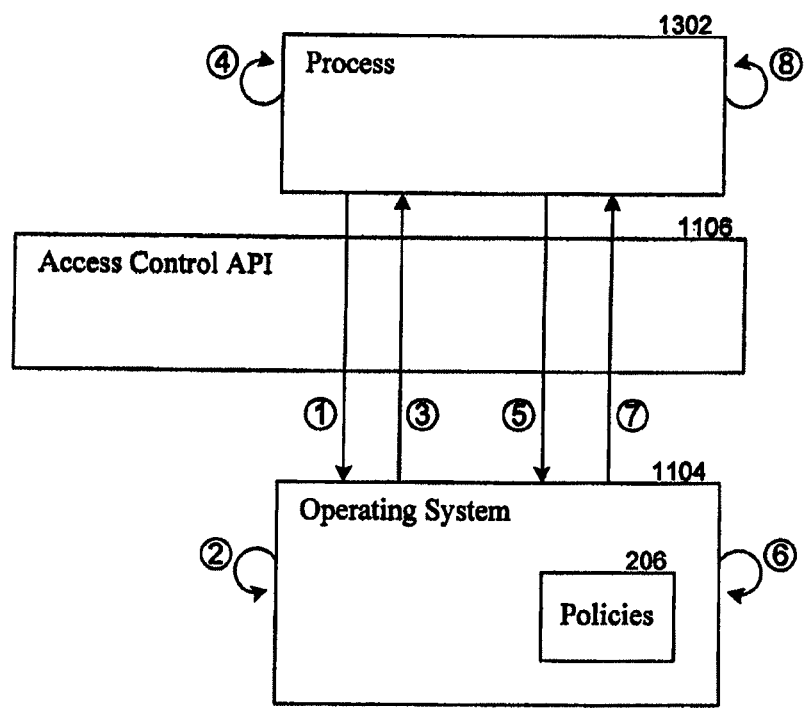
FIG. 13 is a block diagram illustrating a communications flow used by the facility in some embodiments to set a self-imposed policy on a process.

FIG. 13 is a block diagram illustrating a communications flow used by the facility in some embodiments to set a self-imposed policy on a process. By way of example, a user on a computer may have just activated a web browser application program. As part of the initialization process, a web browser application process 1302 sends, via access control API 1106, a request to set my policy to PolicyA to operating system 1104 running on the computer (Stage 1). In response, operating system 1104 sets the policy for process 1302 to PolicyA (Stage 2). If the request includes PolicyA, operating system 1104 stores PolicyA in, for example, policies 206, and sets an indication to apply PolicyA. If the request includes an identifier identifying PolicyA, operating system 1104 uses the identifier to identify, e.g., locate, PolicyA in, for example, policies 206, and sets an indication to apply PolicyA. Operating system 1104 returns to process 1302 the results of the request to set my policy to PolicyA (Stage 3).

Subsequently, process 1302 continues processing with PolicyA being active (Stage 4). The processing may involve interaction with operating system 1104. For example, the user may use process 1302 to upload one or more web applications. Having uploaded a web application, the user may have requested processing of the uploaded web application through process 1302. In response to the user's request, process 1302 sends, via access control API 1106, a request to set my policy to PolicyB to operating system 1104 (Stage 5). For example, process 1302, not trusting the integrity of the uploaded and user initiated web application, requests to set the policy to a more stringent PolicyB. In response, operating system 1104 sets the policy for process 1302 to PolicyB (Stage 6). Operating system 1104 returns to process 1302 the results of the request to set my policy to PolicyB (Stage 7).

Depending on the returned results of the request to set the policy to PolicyB, process 1302 continues processing (Stage 8). For example, if the request to set the policy to PolicyB was successful, process 1302 starts execution of the requested web application. Here, the more stringent PolicyB is applied to the web application process. Alternatively, if the request to set the policy to PolicyB was unsuccessful, process 1302 does not start execution of the web application and may inform the user of an error condition, e.g., reason for not running the web application.

In some embodiments, PolicyB is applied to the web application process and PolicyA is in effect revoked. In this instance, PolicyA may have been a revocable policy. In some embodiments, both PolicyA and PolicyB are applied to the web application process. Here, PolicyA may have been irrevocable and, thus, remains in effect along with PolicyB.

Figure 14:
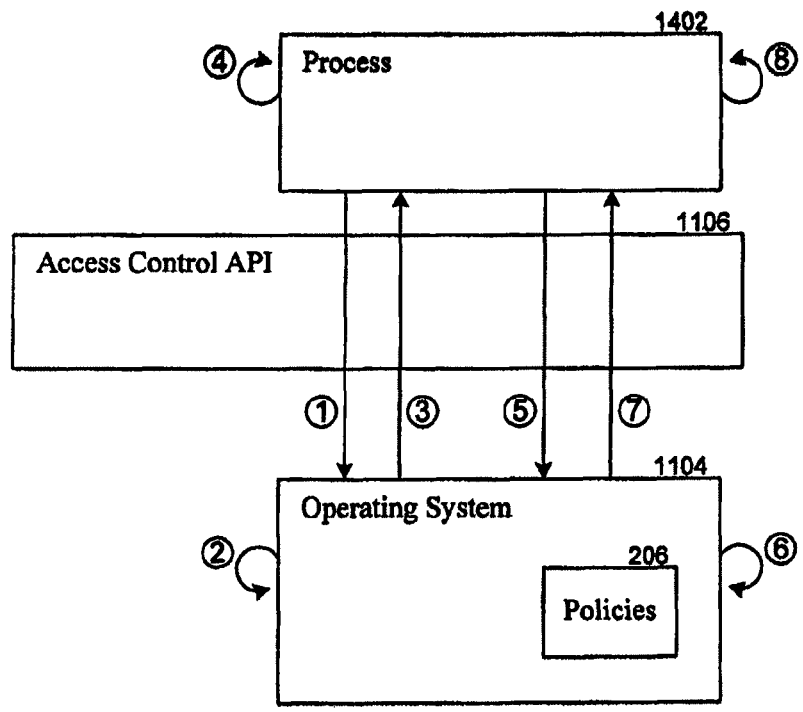
FIG. 14 is a block diagram illustrating a communications flow used by the facility in some embodiments to set a revocable self-imposed policy on a process.

FIG. 14 is a block diagram illustrating a communications flow used by the facility in some embodiments to set a revocable self-imposed policy on a process. By way of example, a user on a computer may be running an application program, and may have come to a point where a macro is to be executed. Knowing the processing that is to be performed by the macro, application process 1402 sends, via access control API 1106, a request to set my revocable policy to PolicyA to operating system 1104 running on the computer (Stage 1). For example, PolicyA may be a more restrictive policy than a policy that is currently being applied to process 1402.

In response, operating system 1104 sets the policy for process 1402 to PolicyA (Stage 2), and returns to process 1402 the results of the request to set my revocable policy to PolicyA (Stage 3). If PolicyA was successfully set, operating system 1104 may also return a cookie containing an identifier and/or state information, e.g., Information regarding any previous policy that was being applied prior to PolicyA, to process 1402. The identifier is used to authenticate the holder as a process that has authorization to revoke the revocable policy.

Depending on the returned results of the request to set the revocable policy to PolicyA, process 1402 continues processing (Stage 4). For example, if the request to set the revocable policy to PolicyA was successful, process 1402 proceeds with executing the macro. Here, the more restrictive PolicyA is applied to the macro. Alternatively, if the request to set the revocable policy to PolicyA was unsuccessful, process 1402 may not proceed with executing the macro.

Subsequently, for example, after detecting that the macro has finished executing, process 1402 sends, via access control API 1106, a request to revoke my policy, e.g., PolicyA, to operating system 1104 (Stage 5). Process 1402 submits the 'cookie' that was previously received from operating system 1104 with the request to revoke my policy. In response to receiving the request to revoke my policy, operating system 1104 uses the identifier contained in the cookie to authenticate process 1402 as a process having authorization to revoke the policy. Subsequent to authenticating process 1402, operating system 1104 revokes PolicyA, and applies the policy identified in the cookie to process 1402 (Stage 6). Operating system 1104 returns to process 1402 the results of the request to revoke my policy (Stage 7), and process 1402 continues processing (Stage 8). In another embodiment, the revoke my policy request may identify a policy that is to be applied subsequent to revoking the current revocable policy.

Figure 15:
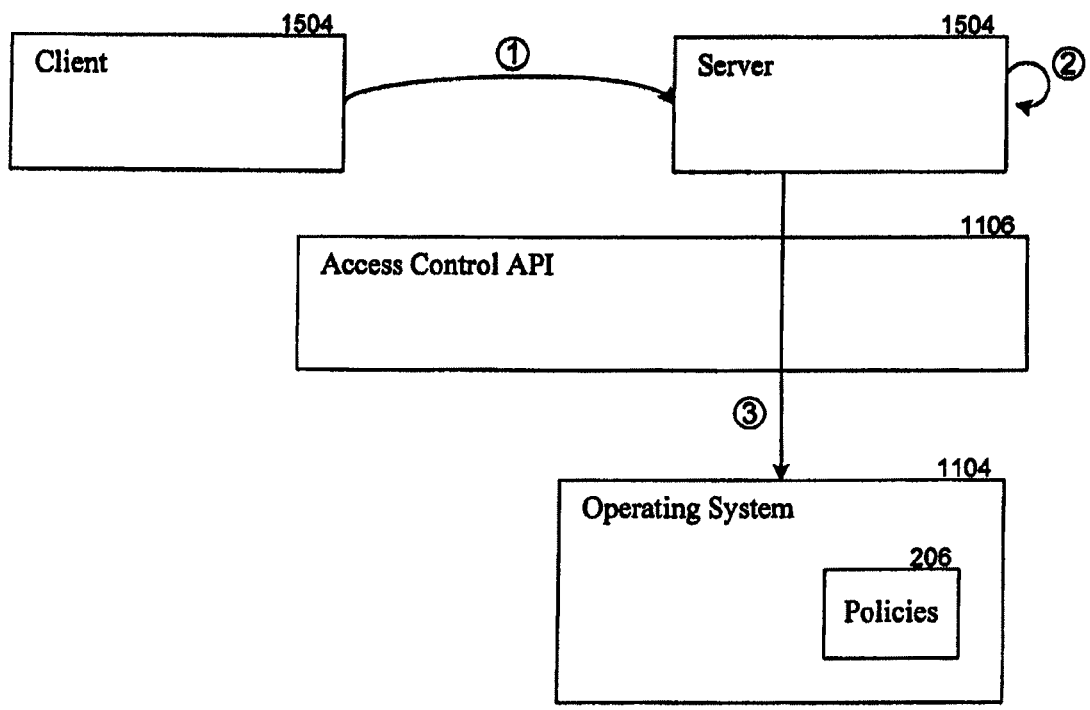
FIG. 15 is a block diagram illustrating a communications flow used by the facility in some embodiments to perform a client-server access control check.

FIG. 15 is a block diagram illustrating a communications flow used by the facility in some embodiments to perform a client-server access control check. By way of example, an email client process 1502 may call an email server process 1504 to send an email message to an addressed recipient (Stage 1). Client process 1502 sends its identifier, e.g., a ClientID, as part of the call to server process 1504. In response, before attempting to send the email message to the addressed recipient, server process 1504 performs a check to determine whether client process 1504 has sufficient privileges to perform the requested action, e.g., in this case, send the email to the addressed recipient. Thus, server process 1504 impersonates client process 1502 by assuming the identity of client process 1502 (Stage 2).

Having assumed the identity of client process 1502, server process 1504 sends, via access control API 1106, a request to perform an access control check to operating system 1104 (Stage 3). The request includes the identity of client process 1502, e.g., ClientID, and the requested action, e.g., send an email message to the addresses recipient. Operating system 1104 performs the access control check and sends server process 1504 an indication of whether client process 1502 has authorization to perform the requested action. In some embodiments, operating system 1104 may check an applicable policy in policies 206 to determine whether client process 1502 has authorization to perform the requested action. In some embodiments, operating system 1104 may utilize authorization module 202 to determine whether client process 1502 has authorization to perform the requested action. Depending on the results of the access control check, server process 1504 either continues processing the email message, e.g., sends the emails message to the addressed recipient, or stops processing the email message and sends client process 1502 an error message. While server process 1504 sent the request to perform the access control check to operating system 1104 in the above example, it will be appreciated that server process 1504 may have directly invoked authorization module 202 to perform the access control check.

Figure 16:
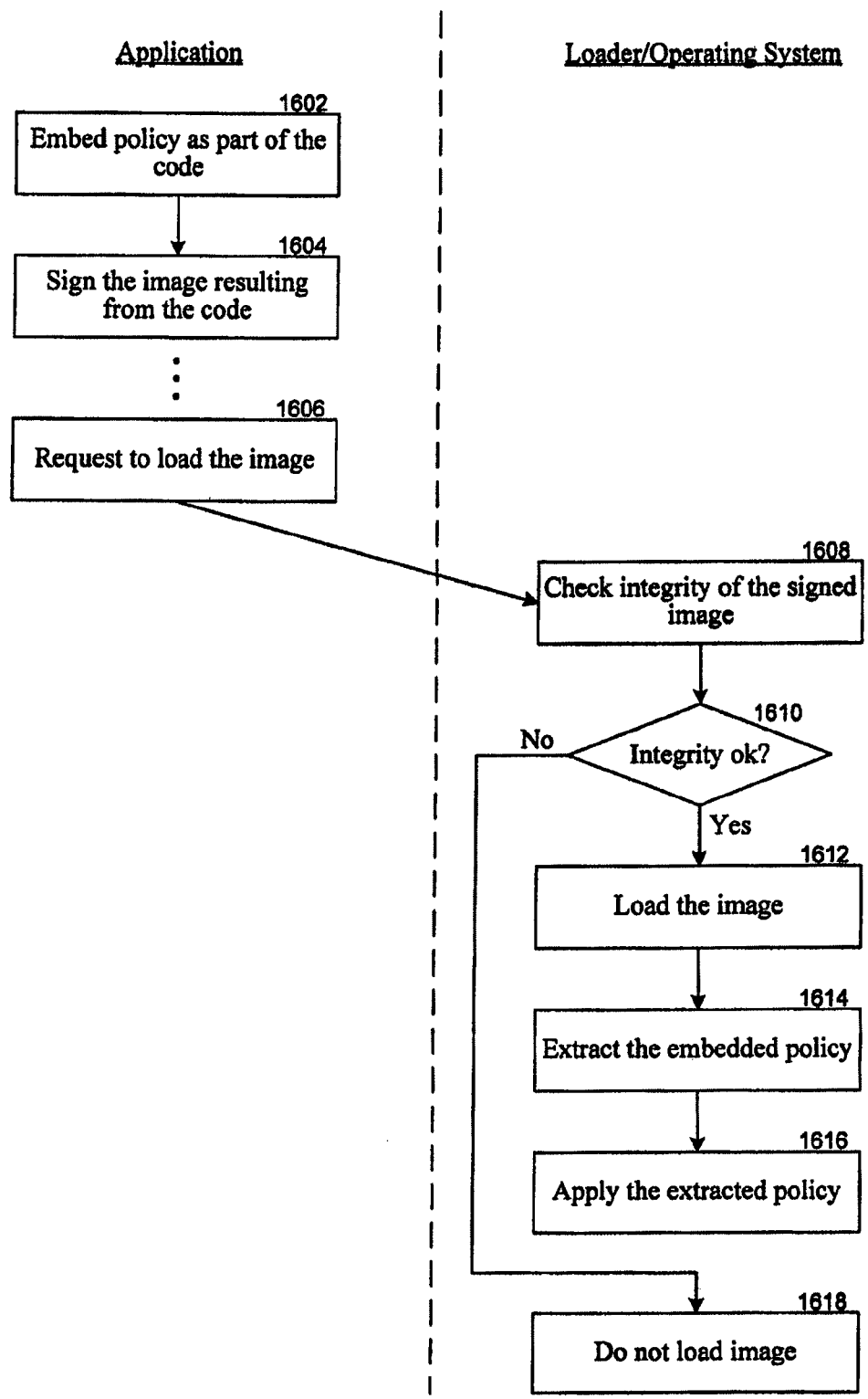
FIG. 16 illustrates a process by which the facility extracts a policy embedded in an application program, according to some embodiments.

FIG. 16 illustrates a process by which a policy embedded in an application program is extracted, according to some embodiments. This allows the policy to be delivered as a part of the software package comprising the application, and the policy is extracted and applied before any of the code comprising the application starts executing. Thus, using this approach, if the code contains defects exploited by malicious code, the attack damage can be reduced and/or contained.

At step 1602, a policy is embedded as part of the code of an application program. The embedded policy is delimited in the application code. In some embodiments, the policy within the code is delimited, for example, by placing in the executable code a flag, which indicates to an operating system or other process suitable for extracting the embedded policy of the presence of the policy. At step 1604, the application program code is signed to protect the resulting image. Code signing provides an assurance that the signed image comes from the provider of the digital signature, e.g., the signer of the code. Digital signatures using a public key and a private key are generally known to those of ordinary skill in the art and, thus, will not be further discussed herein.

Subsequently, at step 1606, a request is made to load the application program image, for example, on a computer. At step 1608, the operating system, or a loader component of the operating system, checks the integrity of the application program image. If the operating system determines the integrity of the application program image is not acceptable (step 1610), then at step 1618, the operating system does not load the application program image on the computer. The operating system may also generate an error condition and provide an indication of the error.

Alternatively, if the operating system determines the integrity of the application program image is acceptable (step 1610), then at step 1612, the operating system loads the application program image on the computer. At step 1614, the operating system checks for the presence of an embedded policy, and if an embedded policy is detected, extracts the policy from the application program image. In some embodiments, the operating system may store the extracted policy in a policy table or repository, e.g., policies 206, provided by the operating system. At step 1616, the operating system applies the extracted policy to the loaded application program image.

Figure 17:
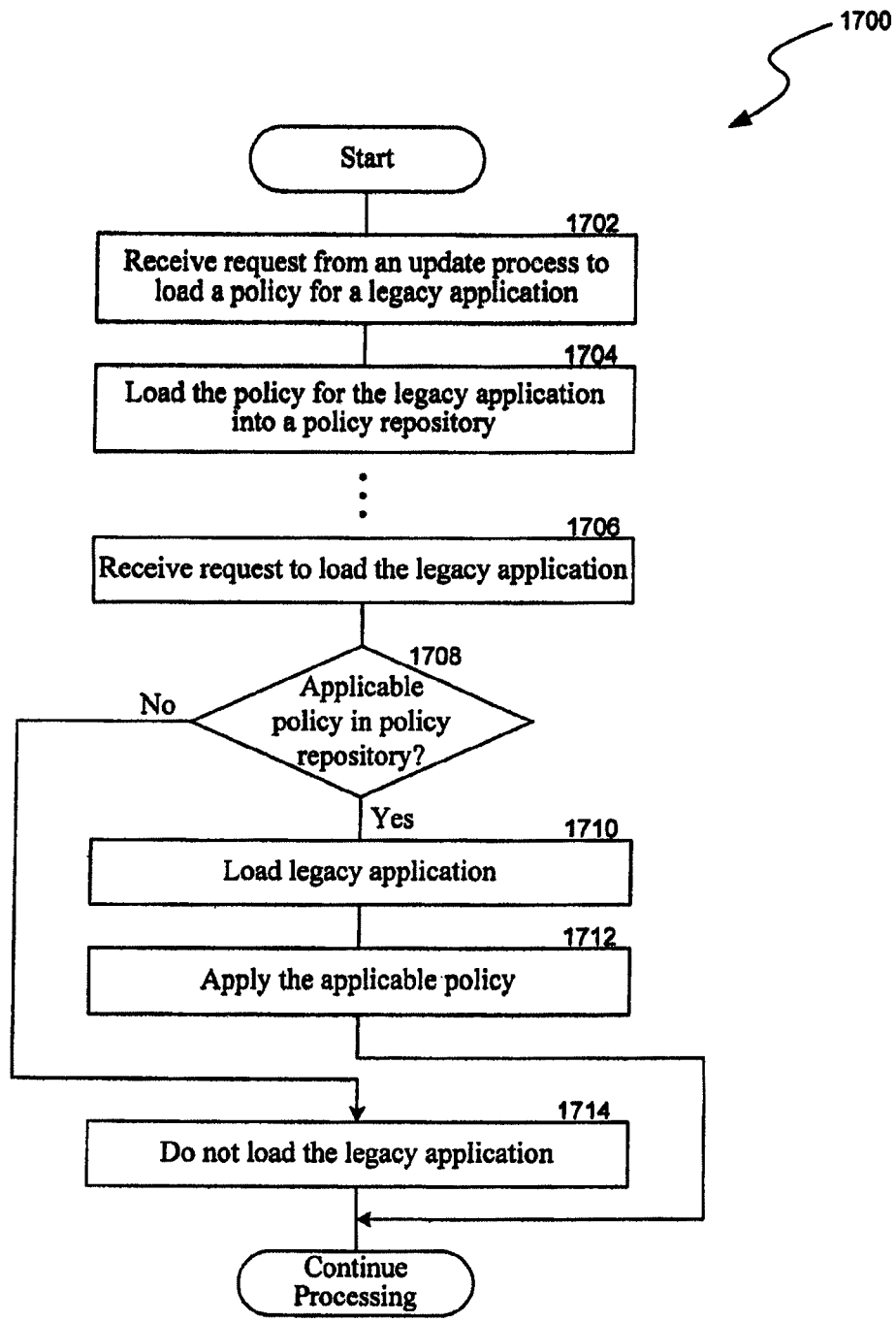
FIG. 17 is a flow chart of a method by which the facility loads and applies a policy on a legacy application program, according to some embodiments.

FIG. 17 is a flow chart of a method 1700 by which the facility loads and applies a policy on a legacy application program, according to some embodiments. By way of example, a legacy application program may be stored on a computer. Wanting to apply a policy to the legacy application program without incurring the risks associated with modifying the legacy application code or the hassles and costs associated with uninstalling, reinstalling and reconfiguring a potentially large number of legacy application programs, a policy for the legacy application program may be delivered by a process independent of the legacy application program.

Beginning at a start step, an operating system executing on a computer hosting legacy application program receives a request from a process to load a policy for the legacy application program at step 1702. For example, the process may be an instance of an update program executing on the computer. Moreover, in addition to the rules that may be included in a policy, the policy may further include rules which are dependent and applicable based on information such as, the version of the legacy application code, the patch level incorporated in the legacy application code, and the like. At step 1704, the operating system receives the policy from the process and loads the policy for the legacy application program. The operating system may validate the process as being authorized to deliver a policy applicable to the legacy application program. The operating system may also validate the integrity of both the process and the policy prior to receiving and storing the policy. In some embodiments, the operating system loads the policy in a policy table or repository and associates the policy to the legacy application program. The association may be indicated by metadata of the policy.

Subsequently, at step 1706, the operating system receives a request to load the legacy application program. At step 1708, the operating system checks to determine if there is a policy that is applicable to the legacy application program. If the legacy application program does not have an applicable policy, then at step 1704, the operating system does not load the legacy application program. In this instance, the operating system may be configured to only load and execute applications that have applicable policies in effect. The operating system may return an error that indicates the failure to load the legacy application program. Subsequent to providing the indication of the error, the operating system continues processing.

If, at step 1708, the operating system determines that the legacy application program does have an applicable policy, then at step 1710, the operating system loads the legacy application program. At step 1712, the operating system applies the policy to the legacy application program during its execution, and continues processing.

From the foregoing, it will be appreciated that specific embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-readable storage medium comprising computer-executable instructions that, when executed by a processor, perform a method comprising:
   receiving from a first process a request to load a first embedded policy and a second embedded policy applicable to an application program, wherein the first embedded policy and the second embedded policy are executed by an operating system access control service;
   storing the first embedded policy and the second embedded policy in a policy repository, wherein the first embedded policy includes a provision to verify that the application program is of a type applicable to the first embedded policy and a set of executable rules that restrict access to a resource, wherein the second embedded policy includes a provision to verify that the application program is of a type applicable to second embedded policy and a set of executable rules that restrict access to a resource, and wherein the second embedded policy is more restrictive than the first embedded policy;
   associating the first embedded policy with a first instance of the application program, such that the first embedded policy must be applied before executing the first instance of the application program;
   applying the first embedded policy;
   executing the first instance of the application program;
   associating the second embedded policy with a second instance of the application program, such that the second embedded policy must be applied before executing the second instance of the application program;
   applying the second embedded policy;
   executing the second instance of the application program;
   receiving a request from the second instance of the application program to access the resource; and
   denying access to the resource based upon the second embedded policy.

2. The computer-readable storage medium of claim 1 further comprising computer-executable instructions that, when executed by the processor, perform the method further comprising:
   determining whether the first embedded policy exists in the policy repository; and
   responsive to determining that the first embedded policy exists in the policy repository, applying the first embedded policy before the executing of the first instance of the application program.

3. The computer-readable storage medium of claim 1 further comprising computer-executable instructions that, when executed by the processor, perform the method further comprising:
   determining whether the first embedded policy exists in the policy repository; and
   responsive to determining that the first embedded does not exist in the policy repository, not executing the first instance of the application program.

4. The computer-readable storage medium of claim 1 wherein the resource comprises a network, a file system, or an application program.

5. The computer-readable storage medium of claim 1 wherein applying the first embedded policy comprises embedding the first embedded policy within the application program.

6. The computer-readable storage medium of claim 1 wherein applying the second embedded policy comprises embedding the second embedded policy within the application program.

7. The computer-readable storage medium of claim 1 wherein applying the first embedded policy comprises embedding the first embedded policy within the application program and wherein applying the second embedded policy comprises embedding the second embedded policy within the application program.

8. The computer-readable storage medium of claim 1 wherein applying the first embedded policy comprises instantiating the first embedded policy.

9. The computer-readable storage medium of claim 1 wherein applying the second embedded policy comprises instantiating the second embedded policy.

10. The computer-readable storage medium of claim 1 wherein applying the first embedded policy comprises instantiating the first embedded policy and wherein applying the second embedded policy comprises instantiating the second embedded policy.

11. A method comprising:
receiving from a first process a request to load a first embedded policy and a second embedded policy applicable to an application program, wherein the first embedded policy and the second embedded policy are executed by an operating system access control service;
storing the first embedded policy and the second embedded policy in a policy repository, wherein the first embedded policy includes a provision to verify that the application program is of a type applicable to the first embedded policy and a set of executable rules that restrict access to a resource, wherein the second embedded policy includes a provision to verify that the application program is of a type applicable to second embedded policy and a set of executable rules that restrict access to a resource, and wherein the second embedded policy is more restrictive than the first embedded policy;
associating the first embedded policy with a first instance of the application program, such that the first embedded policy must be applied before executing the first instance of the application program; and
applying the first embedded policy;
executing the first instance of the application program;
associating the second embedded policy with a second instance of the application program, such that the second embedded policy must be applied before executing the second instance of the application program;
applying the second embedded policy;
executing the second instance of the application program;
receiving a request from the second instance of the application program to access the resource; and
denying access to the resource based upon the second embedded policy.

12. The method of claim 11 further comprising:
determining whether the first embedded policy exists in the policy repository; and
responsive to determining that the first embedded policy exists in the policy repository, applying the first embedded policy before the executing of the first instance of the application program.

13. The method of claim 11 further comprising:
determining whether the first embedded policy exists in the policy repository; and
responsive to determining that the first embedded does not exist in the policy repository, denying the request to execute the first instance of the application program.

14. The method of claim 11 wherein the resource comprises a network, a file system, or an application program.

15. The method of claim 11 wherein applying the first embedded policy comprises embedding the first embedded policy within the application program.

16. The method of claim 11 wherein applying the second embedded policy comprises embedding the second embedded policy within the application program.

17. The method of claim 11 wherein applying the first embedded policy comprises embedding the first embedded policy within the application program and wherein applying the second embedded policy comprises embedding the second embedded policy within the application program.

18. The method of claim 11 wherein applying the first embedded policy comprises instantiating the first embedded policy.

19. The method of claim 11 wherein applying the second embedded policy comprises instantiating the second embedded policy.

20. The method of claim 11 wherein applying the first embedded policy comprises instantiating the first embedded policy and wherein applying the second embedded policy comprises instantiating the second embedded policy.

21. A system comprising:
a processing unit; and
a memory coupled to the processing unit, the memory encoding computer executable instructions that, when executed by the processing unit, perform a method comprising:
receiving from a first process a request to load a first embedded policy and a second embedded policy applicable to an application program, wherein the first embedded policy and the second embedded policy are executed by an operating system access control service;
storing the first embedded policy and the second embedded policy in a policy repository, wherein the first embedded policy includes a provision to verify that the application program is of a type applicable to the first embedded policy and a set of executable rules that restrict access to a resource, wherein the second embedded policy includes a provision to verify that the application program is of a type applicable to second embedded policy and a set of executable rules that restrict access to a resource, and wherein the second embedded policy is more restrictive than the first embedded policy;
associating the first embedded policy with a first instance of the application program, such that the first embedded policy must be applied before executing the first instance of the application program;
applying the first embedded policy;
executing the first instance of the application program;
associating the second embedded policy with a second instance of the application program, such that the second embedded policy must be applied before executing the second instance of the application program;

applying the second embedded policy;

executing the second instance of the application program;

receiving a request from the second instance of the application program to access the resource; and denying access to the resource based upon the second embedded policy.

22. The system of claim 21 wherein the resource comprises a network, a file system, or an application program.

23. The system of claim 21 wherein applying the first embedded policy comprises computer executable instructions encoded within the memory that, when executed by the processing unit, perform the method further comprising embedding the first embedded policy within the application program.

24. The system of claim 21 wherein applying the second embedded policy comprises computer executable instructions encoded within the memory that, when executed by the processing unit, perform the method further comprising embedding the second embedded policy within the application program.

25. The system of claim 21 wherein applying the first embedded policy comprises computer executable instructions encoded within the memory that, when executed by the processing unit, perform the method further comprising embedding the first embedded policy within the application program and wherein applying the second embedded policy comprises computer executable instructions encoded within the memory that, when executed by the processing unit, perform the method further comprising embedding the second embedded policy within the application program.

26. The system of claim 21 wherein applying the first embedded policy comprises computer executable instructions encoded within the memory that, when executed by the processing unit, perform the method further comprising instantiating the first embedded policy.

27. The system of claim 21 wherein applying the second embedded policy comprises computer executable instructions encoded within the memory that, when executed by the processing unit, perform the method further comprising instantiating the second embedded policy.

28. The system of claim 21 wherein applying the first embedded policy comprises computer executable instructions encoded within the memory that, when executed by the processing unit, perform the method further comprising instantiating the first embedded policy and wherein applying the second embedded policy comprises computer executable instructions encoded within the memory that, when executed by the processing unit, perform the method further comprising instantiating the second embedded policy.

29. The system of claim 21 further comprising computer executable instructions encoded within the memory that, when executed by the processing unit, perform the method further comprising:

determine whether the first embedded policy exists in the policy repository; and responsive to determining that the first embedded policy exists in the policy repository, applying the first embedded policy before the executing of the first instance of the application program.

30. The system of claim 29 further comprising computer executable instructions encoded within the memory that, when executed by the processing unit, perform the method further comprising:

determining whether the first embedded policy exists in the policy repository; and responsive to determining that the first embedded does not exist in the policy repository, not executing the first instance of the application program.

\* \* \* \* \*